US012342857B2

(12) United States Patent
Warren et al.

(10) Patent No.: US 12,342,857 B2
(45) Date of Patent: Jul. 1, 2025

(54) AEROSOL-GENERATING DEVICE

(71) Applicant: Nicoventures Trading Limited, London (GB)

(72) Inventors: Luke James Warren, London (GB); Ashley John Sayed, London (GB)

(73) Assignee: Nicoventures Trading Limited, London (GB)

( * ) Notice: Subject to any disclaimer, the term of this patent is extended or adjusted under 35 U.S.C. 154(b) by 764 days.

(21) Appl. No.: 17/437,881

(22) PCT Filed: Mar. 9, 2020

(86) PCT No.: PCT/EP2020/056273

§ 371 (c)(1),
(2) Date: Sep. 10, 2021

(87) PCT Pub. No.: WO2020/182774

PCT Pub. Date: Sep. 17, 2020

(65) Prior Publication Data

US 2022/0167670 A1 Jun. 2, 2022

(30) Foreign Application Priority Data

Mar. 11, 2019 (GB) ...................................... 1903302

(51) Int. Cl.
*A24F 40/40* (2020.01)
*A24F 15/01* (2020.01)
(Continued)

(52) U.S. Cl.
CPC .............. *A24F 40/40* (2020.01); *A24F 15/01* (2020.01); *A24F 40/20* (2020.01); *A24F 40/70* (2020.01); *B05D 5/00* (2013.01); *A24F 40/465* (2020.01)

(58) Field of Classification Search
CPC .......... A24F 40/40; A24F 40/70; A24F 40/20; A24F 40/465; B05D 5/00
(Continued)

(56) References Cited

U.S. PATENT DOCUMENTS 7,581,540 B2 * 9/2009 Hale ...................... A24F 42/60 128/203.27
2009/0180968 A1 * 7/2009 Hale ...................... A61P 21/02 424/443
(Continued)

FOREIGN PATENT DOCUMENTS

CN 203407517 U 1/2014
CN 104 522 891 A 4/2015
(Continued)

OTHER PUBLICATIONS

International Search Report and Written Opinion for International Application No. PCT EP2020/056273, dated May 15, 2021, 17 pages.
(Continued)

*Primary Examiner* — Peter G Leigh
(74) *Attorney, Agent, or Firm* — Merchant & Gould P.C.

(57) ABSTRACT

An aerosol-generating device for generating aerosol from an aerosol-generating material including a housing and a heating assembly arranged in the housing for receiving aerosol-generating material, the heating assembly configured to heat aerosol-generating material received in the heating assembly, wherein at least a portion of the housing has a soft touch coating.

16 Claims, 10 Drawing Sheets

(51) Int. Cl.
*A24F 40/20* (2020.01)
*A24F 40/70* (2020.01)
*B05D 5/00* (2006.01)
*A24F 40/465* (2020.01)

(58) Field of Classification Search
USPC .......................................................... 131/328
See application file for complete search history.

(56) References Cited

U.S. PATENT DOCUMENTS

| | | | | | |
|---|---|---|---|---|---|
| 2010/0006092 | A1* | 1/2010 | Hale | A61M 15/0045 | 128/202.21 |
| 2013/0037041 | A1* | 2/2013 | Worm | A24F 40/42 | 131/329 |
| 2013/0319407 | A1* | 12/2013 | Liu | A24F 40/485 | 128/202.21 |
| 2015/0128970 | A1* | 5/2015 | Liu | A24F 40/485 | 131/329 |
| 2015/0374039 | A1* | 12/2015 | Zhu | H05B 3/03 | 131/329 |

FOREIGN PATENT DOCUMENTS

| | | | | | |
|---|---|---|---|---|---|
| CN | 103124501 | B | * | 6/2015 | A24F 47/008 |
| CN | 207185914 | U | * | 4/2018 | A24F 47/008 |
| CN | 305012568 | S | | 1/2019 | |
| EA | 026076 | B1 | | 2/2017 | |
| JP | 2018529800 | A | | 10/2018 | |
| WO | WO-2006022715 | A1 | * | 3/2006 | A24F 42/10 |
| WO | WO-2013181796 | A1 | * | 12/2013 | A24F 47/008 |
| WO | WO-2016096865 | A2 | * | 6/2016 | A24B 15/167 |
| WO | WO 2016/107767 | | | 7/2016 | |
| WO | WO-2016107767 | A1 | * | 7/2016 | A24F 40/20 |
| WO | 2018190607 | A2 | | 10/2018 | |

OTHER PUBLICATIONS

"International Preliminary Report on Patentability received for PCT Patent Application No. PCT/EP2020/056273, mailed on Sep. 23, 2021".

"Office Action received for Russian Patent Application No. 2021126405, mailed on May 30, 2022", 11 pages.

* cited by examiner

Fig. 8A
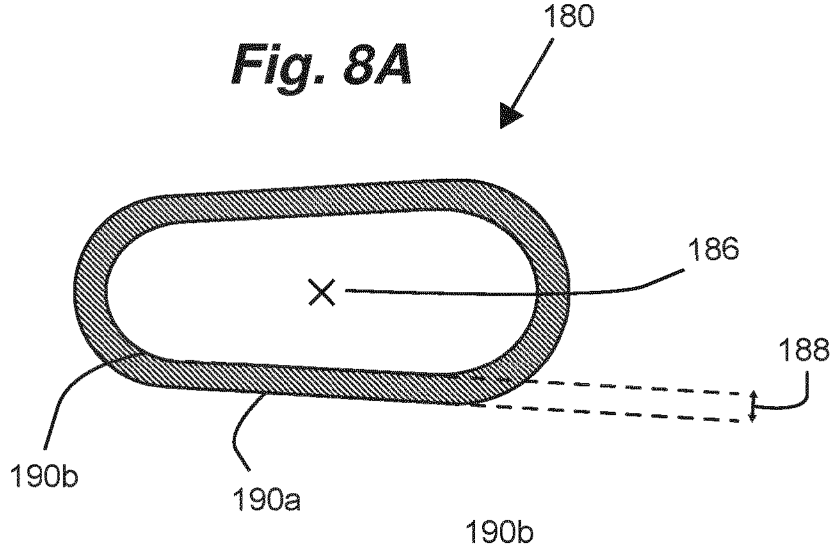
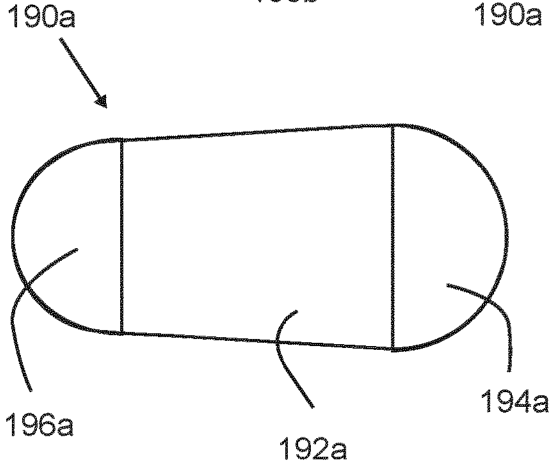
Fig. 8B
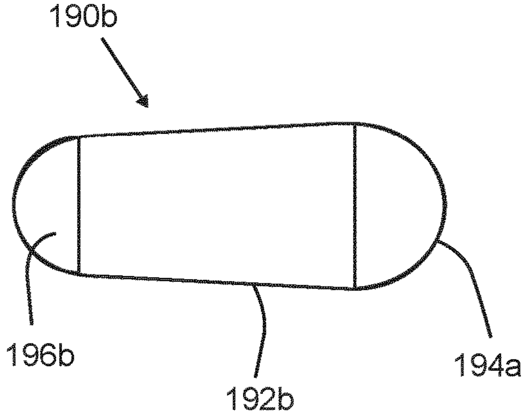
Fig. 8C
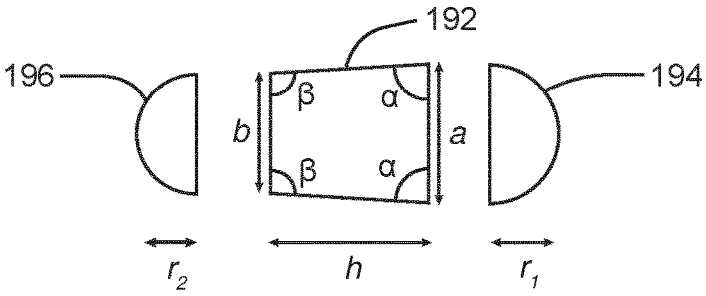
Fig. 8D

AEROSOL-GENERATING DEVICE

RELATED APPLICATION INFORMATION

The present application is a National Phase entry of PCT Application No. PCT/EP2020/056273, filed Mar. 9, 2020, which claims priority from GB Patent Application No. 1903302.6, filed Mar. 11, 2019, each of which is hereby fully incorporated herein by reference.

TECHNICAL FIELD

The present invention relates to an aerosol-generating device, a method of generating an aerosol using the aerosol-generating device, and an aerosol-generating system comprising the aerosol-generating device.

BACKGROUND

Articles such as cigarettes, cigars and the like burn tobacco during use to create tobacco smoke. Attempts have been made to provide alternatives to these types of articles, which burn tobacco, by creating products that release compounds without burning. Apparatus is known that heats smokable material to volatilise at least one component of the smokable material, typically to form an aerosol which can be inhaled, without burning or combusting the smokable material. Such apparatus is sometimes described as a "heat-not-burn" apparatus or a "tobacco heating product" (THP) or "tobacco heating device" or similar. Various different arrangements for volatilising at least one component of the smokable material are known.

The material may be for example tobacco or other non-tobacco products or a combination, such as a blended mix, which may or may not contain nicotine.

SUMMARY

According to a first aspect of the present invention, there is provided an aerosol-generating device for generating aerosol from an aerosol-generating material. The aerosol-generating device comprises a housing, and a heating assembly arranged in the housing for receiving aerosol-generating material, the heating assembly being configured to heat aerosol-generating material received in the heating assembly. At least a portion of the housing has a soft touch coating.

The housing may comprise a body portion, a base, and a top portion, the body portion extending along a first direction from the base portion to the top portion. In one embodiment, the base extends across a first plane substantially perpendicular to the first direction.

In one embodiment, the body portion is a monolithic element.

The body portion may be a substantially tubular element defining a lumen which extends along a first axis in the first direction, the tubular element being open at both a first end and a second end. In one embodiment, the base and top face of the housing are arranged to close the openings at the first end and second end.

The body portion may comprise an inner surface facing a first axis of the lumen, and an outer surface facing away from the first axis of the lumen. In one embodiment, the portion of the housing having a soft touch coating includes a portion of the outer surface of the body portion.

The body portion may further comprise a connecting face, the connecting face connecting the inner surface and the outer surface, wherein the connecting face is connected to the inner surface by an inner edge, and the connecting face is connected to the outer surface by an outer edge. The connecting face may be substantially planar and extends across the first plane. The outer edge may be a rounded edge; the inner edge may be a sharp edge.

In some embodiments, the portion of the housing having a soft touch coating includes the connecting face.

In some embodiments, the portion of the housing having a soft touch coating includes a portion of the inner surface.

In a particular embodiment, the portion of the housing having a soft touch coating is a continuous portion extending along portions of the outer surface, the outer edge, the connecting face, the inner edge, and the inner surface.

In some examples where a portion of the inner surface has a soft touch coating, the coating has an extent from the inner edge in the first direction of from 0.5 mm to 3 mm.

The heating assembly of the device may comprise at least one induction heating unit.

According to a second aspect of the present invention there is provided a body portion for a housing of an aerosol-generating device. The body portion is a substantially tubular element defining a lumen which extends along a first axis in a first direction, the tubular element being open at both a first end and a second end. The body portion comprises an inner surface facing the first axis of the lumen, an outer surface facing the opposite direction to the first axis of the lumen, and a connecting face connecting the inner surface and the outer surface. The connecting face is connected to the inner surface by an inner edge and to the outer surface by an outer edge.

The connecting face may be substantially planar, and may extend in a first plane substantially perpendicular to the first direction.

In some embodiments, the outer edge is a rounded edge, and/or the inner edge forms a right angle between the connecting face and inner surface. The shortest distance between the inner edge and the outer edge across the connecting face may be from 0.5 mm to 5 mm.

The body portion may further comprise a recess arranged along the outer surface of the body portion. The recess may form a channel having a substantially constant width and a depth along the recess, the width and/or being from 0.4 to 1.2 mm. In some embodiments, the depth of the recess is equal to or less than the width of the recess.

In a particular embodiment, the channel comprises a base extending along the bottom of the channel, a first wall connecting a first edge of the channel base to the outer surface of the body portion, and a second wall connecting a second edge of the channel base to the outer surface of the body portion.

The body portion may comprise at least a portion which is provided with a soft touch coating.

According to a third aspect of the present invention there is provided a method of applying a soft touch coating to a body portion as described hereinabove. The method comprises supplying a soft touch coating precursor to a continuous portion of the body portion extending along portions of the outer surface, the outer edge, the connecting face, the inner edge, and the inner surface; and treating the soft touch coating precursor to provide a soft touch coating to the continuous portion.

In one embodiment, the continuous portion extends along the entire outer edge, the entire connecting face, and the entire inner surface.

According to a fourth aspect of the present invention there is provided a method of applying a coating to a body portion having a recess portion comprising a base and side walls as described hereinabove. The method comprises supplying a coating precursor to a continuous portion of the body portion extending along portions of the outer surface, first or second side wall of the recess, and the base of the channel; and treating the coating precursor to provide a coating to the continuous portion.

In one embodiment, the coating precursor is a soft touch coating precursor for providing a soft touch coating.

According to a fifth aspect of the present invention there is provided an aerosol-generating system comprising an aerosol-generating device as described hereinabove in combination with an aerosol-generating article.

According to a further aspect of the present invention there is provided a kit comprising an aerosol-generating device according to any of the above aspects in combination with a removable cover for the aerosol-generating device.

Features described in the context of one aspect are expressly disclosed in combination with other aspects of the present invention, to the extent that they are compatible.

Further features and advantages of the invention will become apparent from the following description of preferred embodiments of the invention, given by way of example only, which is made with reference to the accompanying drawings.

BRIEF DESCRIPTION OF THE DRAWINGS

FIG. 8A shows a characteristic shape of a connecting face of the body portion.

FIGS. 8B-D indicate ways in which the characteristic shape can be defined with reference to 2D shapes.

DETAILED DESCRIPTION

Figure 1A:
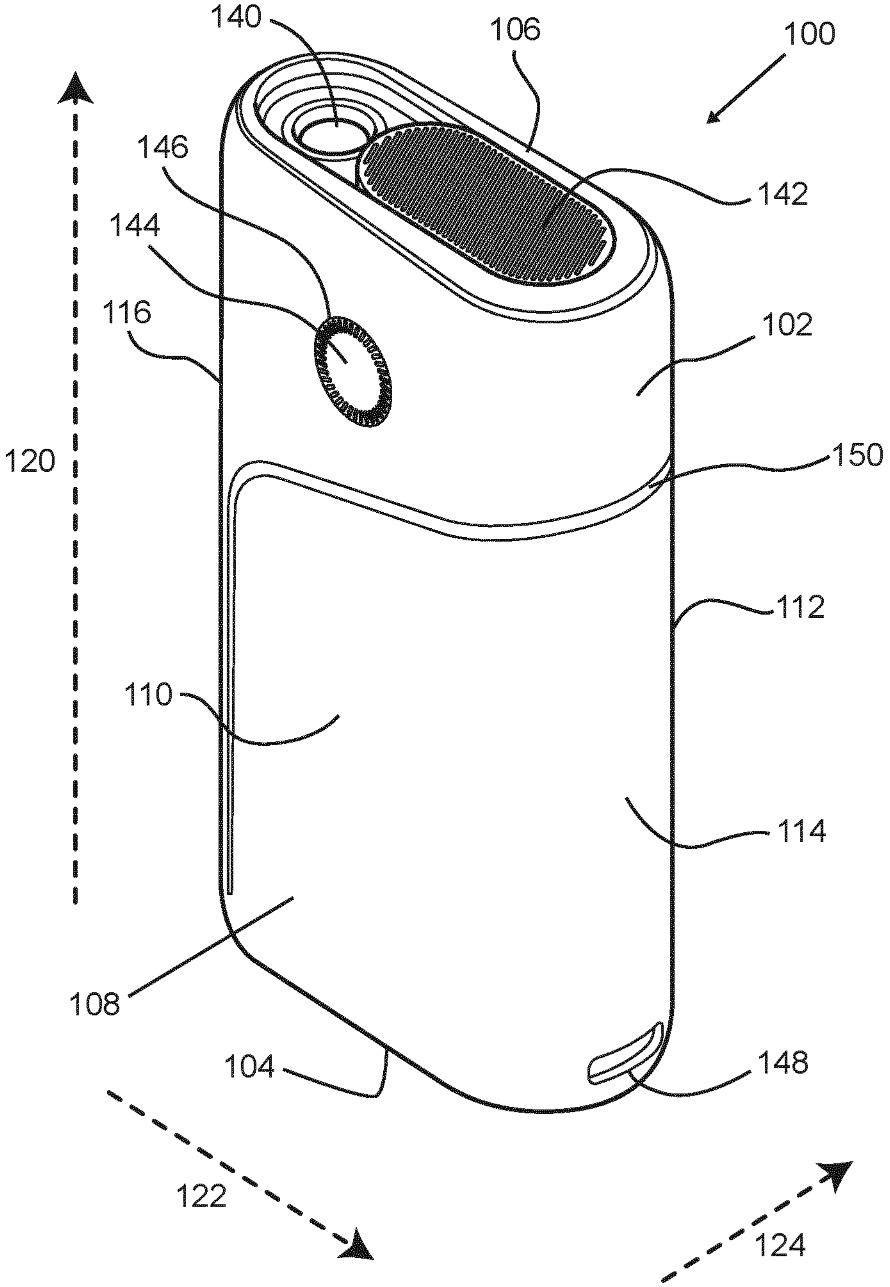
FIG. 1A is a perspective view of an aerosol-generating device comprising a housing according to the present invention.

As used herein, "the" may be used to mean "the" or "the or each" as appropriate. In particular, features described in relation to "the at least one heating unit" may be applicable to the first, second or further heating units where present. Further, features described in respect of a "first" or "second" integers may be equally applicable integers. For example, features described in respect of a "first" or "second" heating unit may be equally applicable to the other heating units in different embodiments. Similarly, features described in respect of a "first" or "second" mode of operation may be equally applicable to other configured modes of operation.

In general, reference to a "first" heating unit in the heating assembly does not indicate that the heating assembly contains more than one heating unit, unless otherwise specified; rather, the heating assembly comprising a "first" heating unit must simply comprise at least one heating unit. Accordingly, a heating assembly containing only one heating unit expressly falls within the definition of a heating assembly comprising a "first" heating unit.

Similarly, reference to a "first" and "second" heating unit in the heating assembly does not necessarily indicate that the heating assembly contains two heating units only; further heating units may be present. Rather, in this example, the heating assembly must simply comprise at least a first and a second heating unit.

As used herein, the term "aerosol-generating material" includes materials that provide volatilised components upon heating, typically in the form of an aerosol. Aerosol-generating material includes any tobacco-containing material and may, for example, include one or more of tobacco, tobacco derivatives, expanded tobacco, reconstituted tobacco or tobacco substitutes. Aerosol-generating material also may include other, non-tobacco, products, which, depending on w the product, may or may not contain nicotine. Aerosol-generating material may for example be in the form of a solid, a liquid, a gel, a wax or the like. Aerosol-generating material may for example also be a combination or a blend of materials. Aerosol-generating material may also be known as "smokable material". In a preferred embodiment, the aerosol-generating material is a non-liquid aerosol-generating material. In a particularly preferred embodiment, the non-liquid aerosol-generating material comprises tobacco.

Apparatus is known that heats aerosol-generating material to volatilise at least one component of the aerosol-generating material, typically to form an aerosol which can be inhaled, without burning or combusting the aerosol-generating material. Such apparatus is sometimes described as an "aerosol-generating device", an "aerosol provision device", a "heat-not-burn device", a "tobacco heating product", a "tobacco heating product device", a "tobacco heating device" or similar. In a preferred embodiment of the present invention, the aerosol-generating device of the present invention is a tobacco heating product. The non-liquid aerosol-generating material for use with a tobacco heating product comprises tobacco.

Similarly, there are also so-called e-cigarette devices, which are typically aerosol-generating devices which vaporise an aerosol-generating material in the form of a liquid, which may or may not contain nicotine. The aerosol-generating material may be in the form of or be provided as part of a rod, cartridge or cassette or the like which can be inserted into the apparatus. A heater for heating and volatilising the aerosol-generating material may be provided as a "permanent" part of the apparatus.

An aerosol-generating device of the present invention can receive an article comprising aerosol-generating material for heating, also referred to as a "smoking article". An "article", "aerosol-generating article" or "smoking article" in this context is a component that includes or contains in use the aerosol-generating material, which is heated to volatilise the aerosol-generating material, and optionally other components in use. A user may insert the article into the aerosol-generating device before it is heated to produce an aerosol, which the user subsequently inhales. The article may be, for example, of a predetermined or specific size that is configured to be placed within a heating chamber of the device which is sized to receive the article.

The aerosol-generating device of the present invention comprises a heating assembly. The heating assembly comprises at least one heating unit arranged to heat, but not burn, the aerosol-generating material in use.

A heating unit typically refers to a component which is arranged to receive electrical energy from an electrical energy source, and to supply thermal energy to an aerosol-generating material. A heating unit comprises a heating element. A heating element is typically a material which is arranged to supply heat to an aerosol-generating material in use. The heating unit comprising the heating element may comprise any other component required, such as a component for transducing the electrical energy received by the heating unit. In other examples, the heating element itself may be configured to transduce electrical energy to thermal energy.

The heating unit may comprise a coil. In some examples, the coil is configured to, in use, cause heating of at least one electrically-conductive heating element, so that heat energy is conductible from the at least one electrically-conductive heating element to aerosol generating material to thereby cause heating of the aerosol generating material.

In some examples, the coil is configured to generate, in use, a varying magnetic field for penetrating at least one heating element, to thereby cause induction heating and/or magnetic hysteresis heating of the at least one heating element. In such an arrangement, the or each heating element may be termed a "susceptor". A coil that is configured to generate, in use, a varying magnetic field for penetrating at least one electrically-conductive heating element, to thereby cause induction heating of the at least one electrically-conductive heating element, may be termed an "induction coil" or "inductor coil".

The device may include the heating element(s), for example electrically-conductive heating element(s), and the heating element(s) may be suitably located or locatable relative to the coil to enable such heating of the heating element(s). The heating element(s) may be in a fixed position relative to the coil. Alternatively, the at least one heating element, for example at least one electrically-conductive heating element, may be included in an article for insertion into a heating zone of the device, wherein the article also comprises the aerosol generating material and is removable from the heating zone after use. Alternatively, both the device and such an article may comprise at least one respective heating element, for example at least one electrically-conductive heating element, and the coil may be to cause heating of the heating element(s) of each of the device and the article when the article is in the heating zone.

In some examples, the coil is helical. In some examples, the coil encircles at least a part of a heating zone of the device that is configured to receive aerosol generating material. In some examples, the coil is a helical coil that encircles at least a part of the heating zone.

In some examples, the device comprises an electrically-conductive heating element that at least partially surrounds the heating zone, and the coil is a helical coil that encircles at least a part of the electrically-conductive heating element. In some examples, the electrically-conductive heating element is tubular. In some examples, the coil is an inductor coil.

In some examples, the heating unit is an induction heating unit. In some examples, the heating unit is a resistive heating unit. A resistive heating unit may consist of a resistive heating element. That is, it may be unnecessary for a resistive heating unit to include a separate component for transducing the electrical energy received by the heating unit, because a resistive heating element itself transduces electrical energy to thermal energy.

The heating assembly may also comprise a controller for controlling each heating unit present in the heating assembly. The controller may be a PCB. The controller is configured to control the power supplied to each heating unit, and controls the "programmed heating profile" of each heating unit present in the heating assembly. For example, the controller may be programmed to control the current supplied to a plurality of inductors to control the resulting temperature profiles of the corresponding induction heating elements. As between the temperature profile of heating elements and aerosol-generating material described above, the programmed heating profile of a heating element may not exactly correspond to the observed temperature profile of a heating element, for the same reasons given above.

The heating assembly may be operable in at least a first mode and a second mode. The heating assembly may be operable in a maximum of two modes, or may be operable in more than two modes, such as three modes, four modes, or five modes.

The device of the present disclosure may be configured to operate in this manner by a controller of the heating assembly being programmed to operate the device in the plurality of modes. Accordingly, references herein to the configuration of the device of the present invention or components thereof may refer to the controller of the heating assembly being programmed to operate the device as disclosed herein.

Each mode may be associated with a predetermined heating profile for each heating unit in the heating assembly, such as a programmed heating profile. For example, the heating assembly may be arranged such that the controller receives a signal identifying a selected mode of operation, and instructs the or each heating element present in the heating assembly to operate according to a predetermined heating profile. The controller selects which predetermined heating profile to instruct the or each heating unit based on the signal received.

One or more of the programmed heating profiles may be programmed by a user. Alternatively, or additionally, one or more of the programmed heating profiles may be programmed by the manufacturer. In these examples, the one or more programmed heating profiles may be fixed such that an end-user cannot alter the one or more programmed heating profiles.

"Session of use" as used herein refers to a single period of use of the aerosol-generating device by a user. The session of use begins at the point at which power is first supplied to at least one heating unit present in the heating assembly. The device will be ready for use after a period of time has elapsed from the start of the session of use. The session of use ends at the point at which no power is supplied to any of the heating elements in the aerosol-generating device. The end of the session of use may coincide with the point at which the smoking article is depleted (the point at which the total particulate matter yield (mg) in each puff would be deemed unacceptably low by a user). The session will have a duration of a plurality of puffs. Said session may have a duration less than 7 minutes, or 6 minutes, or 5 minutes, or 4 minutes and 30 seconds, or 4 minutes, or 3 minutes and 30 seconds. In some embodiments, the session of use may have a duration of from 2 to 5 minutes, or from 3 to 4.5 minutes, or 3.5 to 4.5 minutes, or suitably 4 minutes. A session may be initiated by the user actuating a button or switch on the device, causing at least one heating element to begin rising in temperature. A session may end at after a predetermined duration, such as a programmed duration in a controller. A session is also considered to end if a user deactivates the device, such as before the programmed end of the session of use (deactivation of the device will terminate power being supplied to any of the heating elements in the aerosol-generating device).

"Operating temperature" as used herein in relation to a heating element or a heating unit refers to any heating element temperature at which the element can heat an aerosol-generating material to produce sufficient aerosol for a satisfactory puff without burning the aerosol-generating material. The maximum operating temperature of a heating element is the highest temperature reached by the element during a session of use. The lowest operating temperature of the heating element refers to the lowest heating element temperature at which sufficient aerosol can be generated from the aerosol-generating material by the heating element for a satisfactory puff. Where there is a plurality of heating elements present in the aerosol-generating device, each heating element has an associated maximum operating temperature. The maximum operating temperature of each heating element may be the same, or it may differ for each heating element.

In some embodiments, each mode of operation of the heating assembly may be associated with a predetermined duration for a session of use (i.e. a predetermined duration for a session of use), or a predetermined maximum operating temperature. In some embodiments, the session of use duration associated with at least one mode differs from the session of use duration(s) associated with other modes. In some embodiments, each mode may be associated with different predetermined durations of session of use. In particular, the first mode may be associated with a first session of use duration, and the second mode may be associated with a second session of use duration. The first session of use duration may differ from the second session of use duration. Preferably, the first session of use duration is longer than the second session of use duration. In some examples, the first and/or second session of use may have a duration of at least 2 minutes, 2 minutes 30 seconds, 3 minutes, 3 minutes 30 seconds, 4 minutes, 4 minutes 30 seconds, 5 minutes, 5 minutes 30 seconds, or 6 minutes. In some examples, the first and/or second session of use may have a duration of less than 7 minutes, 6 minutes, 5 minutes 30 seconds, 5 minutes, 4 minutes 30 seconds, or 4 minutes. Preferably, the first session of use has a duration of from 3 minutes to 5 minutes, more preferably from 3 minutes 30 seconds to 4 minutes 30 seconds. Preferably, the second session of use has a duration of from 2 minutes to 4 minutes, more preferably from 2 minutes 30 seconds to 3 minutes 30 seconds.

Each mode may be associated with a maximum temperature to which the or each heating unit in the heating assembly rises in use. In some embodiments, the heating assembly is configured such that the first heating unit reaches a first-mode maximum operating temperature in the first mode, and a second-mode maximum operating temperature in the second mode. The maximum operating temperature of the first heating unit in the first mode (herein referred to as the "first-mode maximum operating temperature" of the first heating unit) may differ from the maximum operating temperature of the first heating unit in the second mode (herein referred to as the "second-mode maximum operating temperature" of the first heating unit). In some examples, the first mode maximum operating temperature is higher than the second-mode maximum operating temperature; in other examples, the first-mode maximum operating temperature is lower than the second-mode maximum operating temperature. Preferably, the second-mode maximum operating temperature of the first heating unit is higher than the first-mode maximum operating temperature of the first heating unit.

The device of the present invention comprises a housing. The housing is generally the aspect of the device which a user interacts with most. It is therefore important to provide a housing with a pleasing visual appearance as well as an ergonomically comfortable shape. Surprisingly, it has been found that providing at least a portion of the housing with a coating, especially a soft touch coating, may improve the visual appeal as well as the tactile appeal of the device.

"Soft touch coating" has a generally recognised meaning in the art. For the avoidance of doubt, a portion of a surface provided with a soft touch coating provides a user with a sensation of a surface which is softer than a corresponding uncoated portion of a surface when the user touches the soft touch coating. Such a coating may be more appealing to a user, and/or provide a more premium appearance. A soft touch coating may also advantageously provide the housing with a scratch-resistant coating. In a preferred embodiment, the soft touch coating has a matte texture.

The soft touch coating may contain pigment. That is, the soft touch coating may provide the housing with a colour. In another embodiment, the soft touch coating does not contain pigment; the soft touch coating is not coloured. In a particular embodiment, the coating is substantially transparent. In the context of the present invention, "transparent" is taken to mean that the coating allows the passage of light such that a colour of the surface underlying the soft touch coating can be discerned by a user viewing the device.

Surprisingly, it has been found that a transparent soft touch coating having a matte finish may improve the readability of text disposed underneath the soft touch coating.

The coating may have any suitable thickness. For example, the coating may have a thickness of less than 2 mm, or less than 1 mm.

The soft touch coating may be prepared by supplying a coating precursor on the surface of the housing, and treating the precursor to provide the coating.

In some examples, the coating precursor comprises a polyurethane dispersion (PUDs), and/or a polyacrylate (PAC) emulsion crosslinked with either polyisocyanates or carbodiiamides, and/or silicones.

In some examples, the coating precursor may comprise gloss oil, solvent, and matting powder. In a particular example, the coating precursor may comprise gloss oil in an amount of 40% to 75% w/w, solvent in an amount of from 20 to 45% w/w, and matting powder in an amount of from 0 to 15%, preferably from 2% to 12%. The matting powder may comprise silica, or consist of silica.

The coating precursor may be applied to the surface of the housing by any suitable means. In one example, the precursor may be provided as a liquid. For example, in one aspect, the coating precursor may be a paint. In these examples, the precursor may be deposited by dip coating, spin coating, spray coating, or screen printing, for example. In another example, the precursor may be provided as a powder. In these examples, the precursor may be deposited by powder spraying, for example.

Where the precursor is a paint, treating the precursor may comprise drying the precursor. Drying in the context of the present invention does not necessarily mean the active application of a drying means to the precursor; rather, drying is taken to include passive techniques such as leaving the surface bearing the precursor in an atmosphere such that the paint dries to form the coating.

In some embodiments, treating the precursor may comprise curing the precursor. The mode of curing will depend on the nature of the precursor, but may include heating the precursor, or irradiating the precursor with electromagnetic waves (such as UV light) to cure the precursor and provide the coating.

The configuration of the housing and coating may reduce the surface temperature reached by the device during operation compared with another device. In some embodiments, during a session of use, the surface of the device reaches a temperature of less than 55° C., preferably 50° C., more preferably 48° C., most preferably 45° C.

According to one aspect of the present invention there is provided a kit comprising an aerosol-generating device for generating aerosol from an aerosol-generating material, in combination with a removable cover for the aerosol-generating device. The removable cover may also be referred to as a "sleeve". The aerosol-generating device may be any suitable aerosol-generating device, such as an aerosol-generating device as described herein. In some examples according to this aspect, the housing of the aerosol-generating device has a soft-touch coating; in other examples, the housing of the aerosol-generating device does not have a soft-touch coating.

The removable cover has an inner surface which is configured such that, when the cover is provided on the aerosol-generating device, the inner surface contacts at least a portion of the housing of the aerosol-generating device. In examples, the inner surface defines a volume within which the aerosol-generating device may be arranged in use.

The removable cover typically has an opening through which the aerosol-generating device can be supplied to the volume or removed from the volume; the removable cover can be applied to/removed from the device by sliding the removable cover relative to the device. In examples, the removable cover is open at two ends (typically opposite ends), and the removable cover defines a lumen (the volume) which extends along an axis between the open ends.

The removable cover has an outer surface which is configured such that, when the cover is provided on the aerosol-generating device, a user can touch the outer surface of the removable cover when interacting with the aerosol-generating device. In examples, the removable cover forms a barrier between at least a portion of the housing of the aerosol-generating device and a user. The present inventors have identified that, when the removable cover is arranged around the aerosol-generating device during operation of the device, the outer surface of the removable cover typically has a surface temperature which is lower than the surface temperature of the housing.

The removable cover may comprise any suitable material. In examples, substantially all of the removable cover is formed of the same material. In examples, the removable cover comprises a thermal insulator. In examples the removable cover is fibrous, e.g. comprises textile fibres. In examples the removable cover is an elastomer, e.g. the removable cover comprises and/or consists of silicone. An elastomeric removable cover is easily removed from around an aerosol-generating device when desired, and retains the aerosol-generating device within the cover well when desired.

Advantageously, the inventors have identified that providing an aerosol-generating device with a removable cover comprising a thermal insulator reduces the surface temperature experienced by a user during use of the aerosol-generating device, thereby providing an improved user experience.

Further, providing an aerosol-generating device in combination with a removable cover may provide a more desirable appearance by, for example, the removable cover having a distinctive colour or surface pattern.

The removable cover typically comprises one or more apertures through which a user can interact with the device. In examples, the removable cover comprises an aperture which corresponds to a user interface and/or indicator of the device, e.g. the removable cover is configured such that, when the device is arranged within the removable cover, the aperture is positioned around the user interface and/or indicator such that the removable cover does not cover the user interface and/or indicator of the device. The user interface typically comprises an actuator for controlling the device and/or a display. In examples, the removable cover comprises an aperture which corresponds to a socket/port for receiving a cable to charge a battery of the device, e.g. the removable cover is configured such that, when the device is arranged within the removable cover, the aperture is positioned around the socket/port such that a power cable can pass through the aperture to the socket/port.

Further aspects of the present invention will be now be described with respect to the drawings.

Figure 1B:
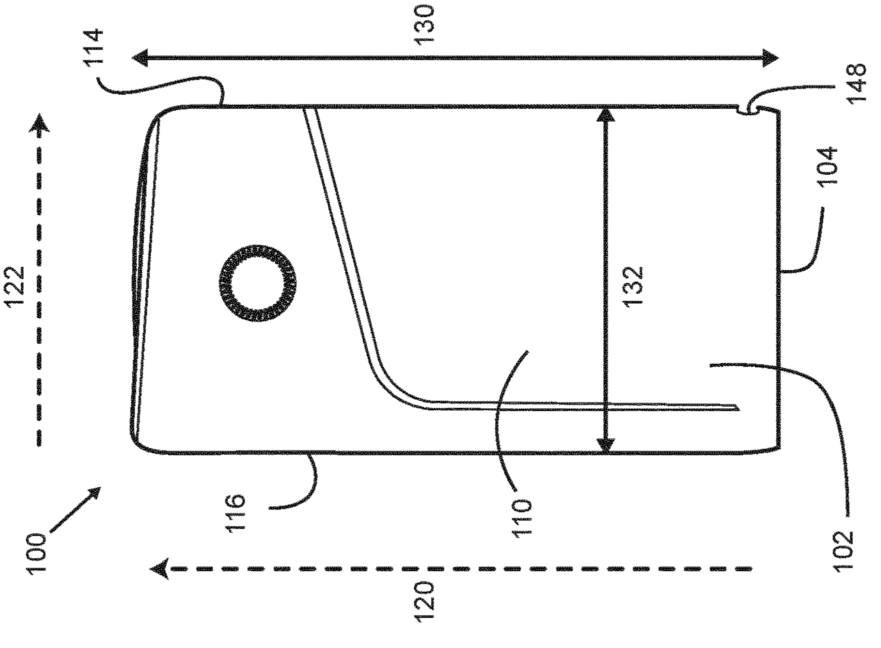
FIGS. 1B-D are front, side and top elevations respectively of the device.
Figure 1C:
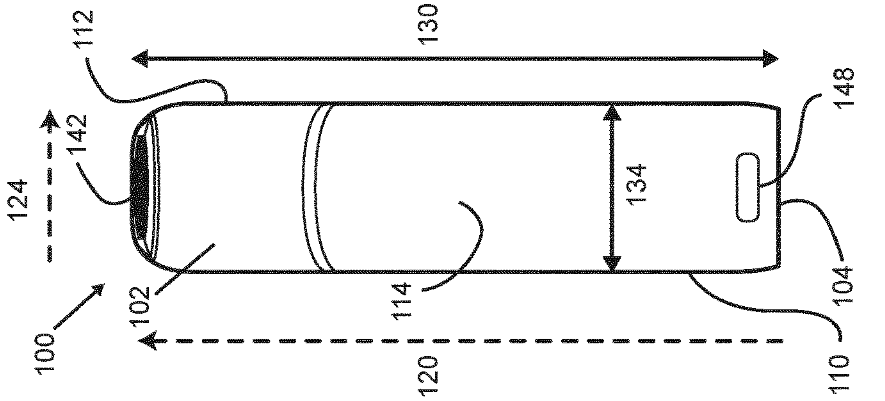
Figure 1D:
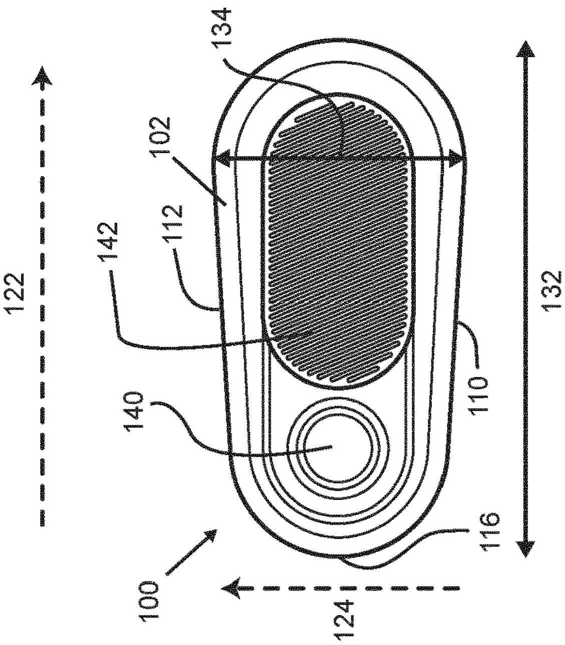

FIG. 1A is a perspective view of an aerosol-generating device 100 according to the present invention; FIG. 1B is a front elevation of the device 100; FIG. 1C is a side elevation of the device 100; FIG. 1D is a top elevation of the device 100.

The device 100 comprises a housing 102. The housing may comprise a base 104, a top face 106, and a body portion 108. The body portion may comprise a front face 110, a rear face 112, a first side portion 114, and a second side portion 116.

The housing extends in a first direction 120, a second direction 122, and a third direction 124. Each direction is perpendicular to the other directions; the first, second and third directions 120, 122, 124 define a three-dimensional space.

FIGS. 2A to 2C further indicate the first, second and third directions 120, 122, 124 and the extend of the housing 102. In the first direction 120 the housing 102 has a characteristic extent 130 of not more than 85 mm. Preferably, the extent 130 in the first direction 120 is more than 70 mm, more than 75 mm, or more than 80 mm. Suitably, the extent 130 in the first direction 130 is 82 mm. The characteristic extent 130 in the first direction 120 may conveniently be referred to as the height 130 of the housing 102, and refers to the greatest extent of the housing in that direction.

In the second direction 122 the housing 102 has a characteristic extent 132 of not more than 45 mm. Preferably, the extent 132 in the second direction 122 is more than 30 mm, 35 m, or 40 mm. Suitably, the extent 132 in the second direction 132 is 43 mm. The characteristic extent 132 in the second direction 132 may conveniently be refers to as the width 132 of the housing 102, and refers to the greatest extent of the housing 102 in the second direction 122.

In the third direction 124 the housing 102 has a characteristic extent 134 of not more than 23 mm. Preferably, the extent 134 in the third direction 124 is more than 10 mm, 15 mm, or 20 mm. Suitably, the extent 134 in the third direction 124 is 21 mm.

It has been found by the inventors that a housing 102 having the parameters set out above is surprisingly suitable for being held in a user's hand. These dimensions present an ergonomic device which may be more satisfying to a user during a session of use.

Inside the housing 102 there is disposed a heating assembly (not shown) for receiving aerosol-generating material, preferably in the form of an aerosol-generating article. The heating assembly is configured to heat aerosol-generating material received in the heating assembly. For example, the heating assembly may define a chamber in which the aerosol-generating article can be received, and comprise one or more heating units arranged around the chamber for externally heating the aerosol-generating article. In another embodiment, the heating assembly may comprise a heating unit configured to be inserted into an aerosol-generating article received in the heating assembly, such that in use the heating unit internally heats the aerosol-generating article, i.e. heats the aerosol-generating material from inside the aerosol-generating article. The heating assembly defines an aperture 140 through which an aerosol-generating article may be inserted to the heating assembly. The aperture 140 is preferably arranged in the top surface 106 of the housing 102.

The device optionally includes a slidable cover 142 arranged in a portion of the housing 102. In the device shown in FIGS. 1A to 1D, the slidable cover 142 is arranged on the top face 106. The slidable cover 142 is arranged such that a user can position the slidable cover 142 in at least a first position and a second position. The slidable cover 142 is configured such that, in the first position, the slidable cover covers the aperture 140, thereby prohibiting undesired material from entering the heating assembly. The slidable cover 142 is also configured such that, in a second position, the slidable cover 142 does not cover the aperture 140, allowing for the insertion of an aerosol-generating article.

The device also comprises a user interface 144 for a user to activate the device 100, the user interface being arranged in a portion of the housing. Optionally, the user interface 144 may also be configured such that a user may select a desired mode of operation of the device 100 by interacting with the user interface 144 in a predetermined manner.

The device further comprises an indicator 146 for indicating the operation of the device 100 to a user. For example, the indicator 146 may be configured to indicate that the device 100 is turned on, and/or that a heating session is in progress. Further, in embodiments wherein the device 100 is operable in a plurality of modes, the indicator 146 may indicate the selected mode of operation to the user.

Preferably, the user interface 144 and indicator 146 are arranged together in a surface of the housing 102. In a particularly preferred embodiment as shown in FIG. 1, the indicator 146 is arranged to surround the user interface 144.

The housing may include an aperture 148 for receiving an electrical connector/component of the device, such as a socket/port, which can receive a cable to charge a battery of the device 100. For example, the socket may be a charging port, such as a USB charging port. In some examples the socket may be used additionally or alternatively to transfer data between the device 100 and another device, such as a computing device. Preferably, the aperture 148 is provided in the first side portion 114 or the second side portion 116. This configuration may allow for the device 100 to receive electrical charge which resting on the base 104 on a flat surface. In a particularly preferred embodiment, a battery is arranged within the housing closer to the first side portion 114 than the second side portion, the aperture 148 is provided in the first side portion 114, and a charging port is arranged in the aperture 148.

The housing 102 may also be provided with a contrast feature 150. The contrast feature 150 may be provided with a different colour, and may advantageously be used to indicate the model of the device. The contrast feature 150 may be formed of a pigment layer (i.e. provided by painting) and substantially flush with the surface of the housing 102. Alternatively, the contrast feature 150 may be machined. For example, the contrast feature 150 may form an indentation or recess across the surface of the housing. Optionally, the contrast feature 150 may be provided with a different finish.

Preferably, the contrast feature 150 forms a recess along the surface of the housing. The recess may form a channel having a base, a first side wall connecting the surface of the housing w to a first edge of the base, and a second side wall connecting the surface to a second edge of the base. The recess may have a substantially constant width and depth along the recess. The width of the recess is taken to be the shortest distance between first side wall and second side wall at any point along the recess. The depth of the recess is taken to be the distance from the deepest point of the channel to the surface of the housing at any point along the recess, measured perpendicular to the deepest point of the channel.

The recess may suitably have a substantially constant width and a depth along the recess, the width and/or depth being from 0.4 to 1.2 mm. Preferably, the depth of the recess is equal to or less than the width.

In a preferred embodiment, the contrast feature 150 delimits two portions of the housing 102 having different appearances. For example, the contrast feature 150 may be arranged between a portion of the housing having a first colour and another portion having a second colour different from the first colour. Alternatively, or additionally, the contrast feature 150 may be arranged between portions of the housing having different finishes. In a particularly preferred embodiment, the contrast feature 150 is arranged between a portion of the housing having a soft touch coating, and a portion of the housing without a soft touch coating.

An aspect of the present invention is a method of applying a coating precursor to a portion of the housing 102, such as a soft coating precursor. In one embodiment, the method comprises applying the coating to a portion which abuts the contrast feature 150. Preferably, this method comprises applying the coating to the portion of the surface of the housing abutting the contrast feature as well as to the first or second side wall of the contrast feature 150 and optionally a portion of the base of the contrast feature 150. This may provide a coating with an "end" arranged within the recess, advantageously at least partially prohibiting a user from peeling away the soft touch surface. This arrangement may also reduce the chance of the "end" of the coating being knocked and delaminating from the surface.

The housing may be formed of any suitable material. In a preferred embodiment, at least a portion of the housing comprises aluminium. For example, at least 50%, 60%, 70%, or 80% by weight of the housing 102 may be formed of aluminium. In a particularly preferred embodiment, at least a portion of the housing 102 comprises anodized aluminium. For example, the housing 102 have an aluminium metal base covered with an anodized aluminium layer.

Figure 2:
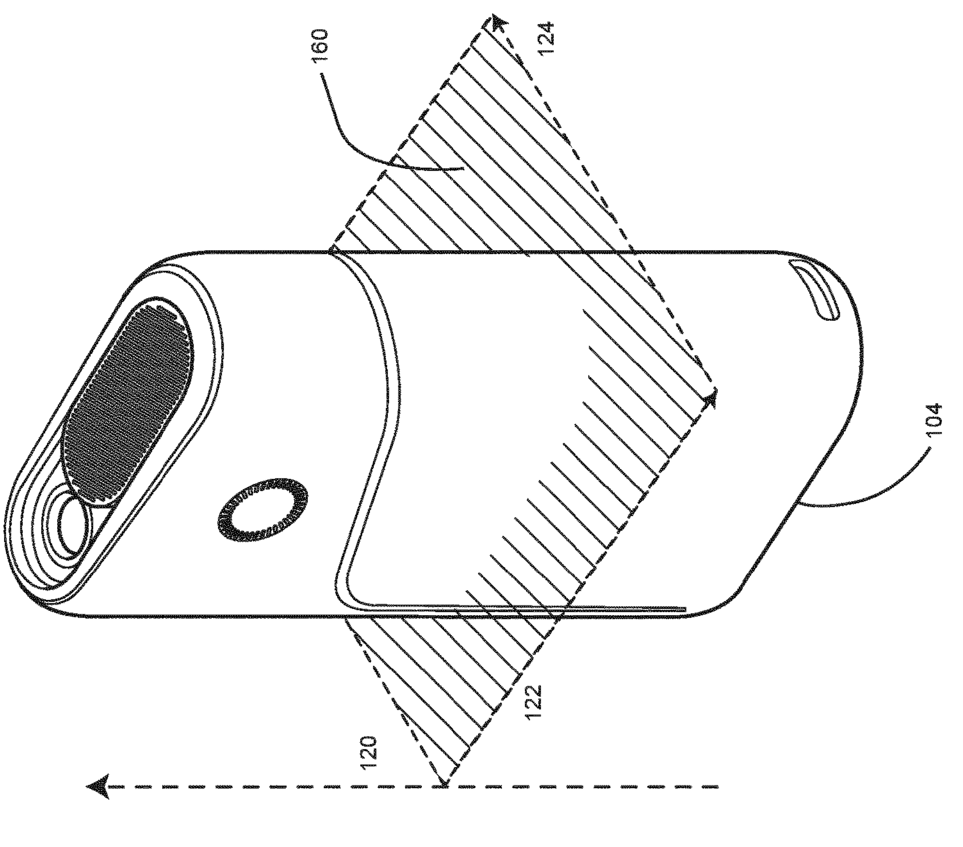
FIG. 2 is a perspective view of an aerosol-generating device according to the present invention showing a first plane.

FIG. 2 shows device 100. The housing 102 comprises a base 104. The base is arranged in a first plane 160 which is normal to the first direction 120. The first plane 160 extends along the second direction 122 and the third direction 124. Such an arrangement may provide an aerosol-generating device 100 which may conveniently be rested on a flat surface in between use. Moreover, when the base 104 is substantially planar as shown in the present figures, the device 100 may be displayed in a stationary manner on a flat surface.

Features of the device may alternatively be arranged in a second plane 162 normal to the second direction 122 and extending in the first and third directions 122, 124, or in a third plane 164 normal to the third direction 124 and extending in the first and second directions 120, 122. Further reference will be made to the second and third planes 162, 164, hereinbelow.

Figure 3:
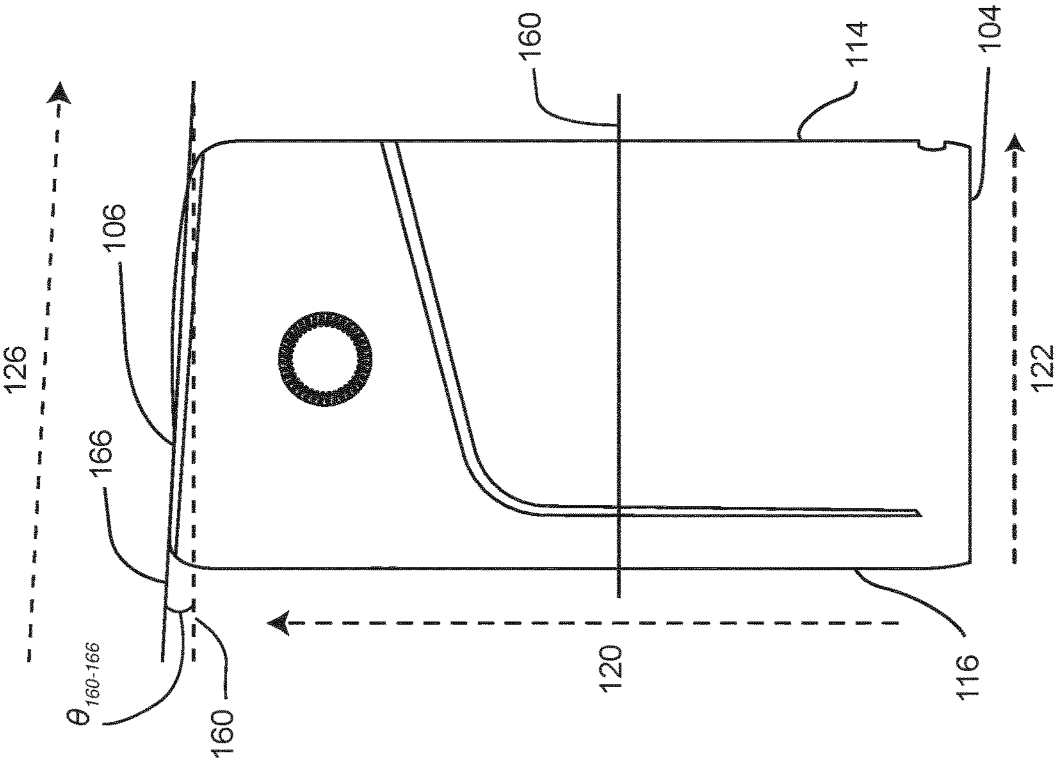
FIG. 3 is a front elevation of an aerosol-generating device according to the present invention showing the angle of the top face of the housing.

The housing 102 also comprises a top face 106. The top face is arranged to be opposed from the base 104 across the plane 160. The top face may be substantially coplanar with the base 104 and lie in the first plane 160. Preferably, though, the top face is not coplanar with the base 104. Rather, as shown in FIG. 3, the top face preferably extends in a fourth plane 166. The fourth plane 166 extends in the third direction 124, and forms a dihedral angle $\theta_{160-166}$ with the first plane 160. The dihedral angle $\theta_{160-166}$ thus corresponds to the angle between the base 104 and the top face 106. The dihedral angle $\theta_{160-166}$ is greater than 0°. The dihedral angle $\theta_{160-166}$ is preferably less than 5°, more preferably less than 4°, still more preferably less than 3°. The dihedral angle is preferably greater than 0.5°, 1°, 1.5°, or 2°. In a preferred embodiment, the dihedral angle is approximately 2.5°. The inventors have found that a top face which is arranged with a slope as defined herein may feel more comfortable to a user when the device is held in the hand.

The fourth plane 166 may also be defined as extending in the third direction 124 and a fourth direction 126. The fourth direction 126 is perpendicular to the third direction 124 and $-\theta_{160-166}$ from the second direction 122.

In a particularly preferred embodiment, the dihedral angle $\theta_{160-166}$ is less than 5° C., and the sliding cover 142 is configured to be slidable along an axis in the fourth direction 126. The inventors have found that this configuration is more comfortable for a user when moving the sliding cover 142 to reveal or cover the aperture 140. The sliding cover 142 may be arranged to be substantial parallel with the top face 106. In one embodiment, the sliding door has a thickness of less than 10 mm, or 9 mm, or 8 mm, or 7 mm, or 6 mm, or 5 mm, or 4 mm, or 3 mm, or 2 mm. The thickness of the sliding cover 142 is defined as the extent of the sliding door in a direction perpendicular to the fourth plane 166. The sliding cover may be provided with a grooved texture on the top surface of the sliding cover. Advantageously, this grooved texture may mean that the sliding door may be moved by a user more easily because it provides a greater grip.

The base 104 and top face 106 are connected by a body portion. The body portion comprises the front face 110, the rear face 112, the first side portion 114, and the second side portion 116.

Figure 5:
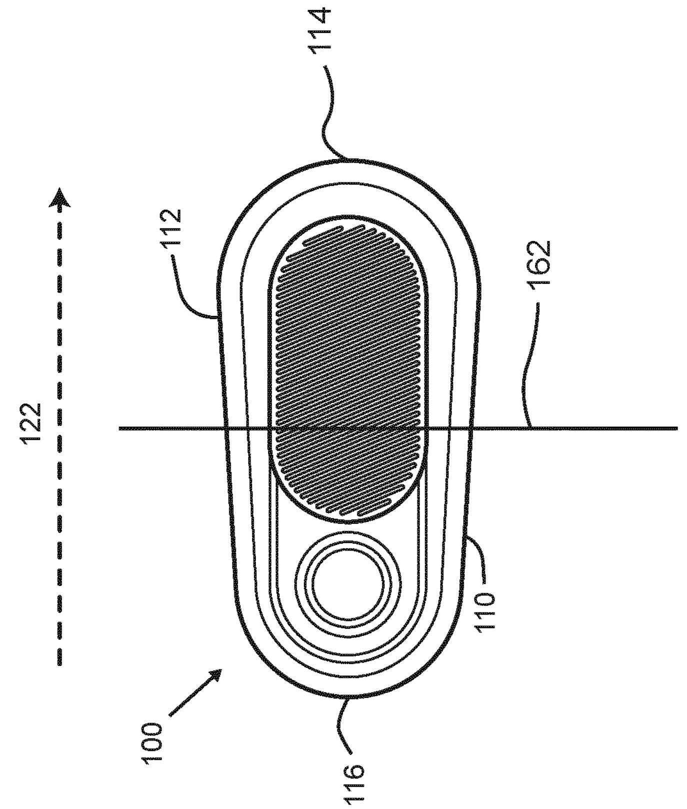
FIG. 5 is a top elevation of an aerosol-generating device according to the present invention showing a second plane.

As shown in FIG. 5, the first side portion 114 connects the front face 110 and rear face 112 at a first edge of the faces 110, 112, and the second side portion 116 connects the front face 110 and rear face 112 at a second edge of the faces 110, 112. The first side portion 114 is arranged opposite to the second side portion 116. Preferably, the first side portion 114 is arranged opposed to the second side portion 116 across the second plane 162.

The first side portion 114 and second side portion 116 both extend in the first direction. Preferably, each side portion is curved in the first plane 160.

Figure 4:
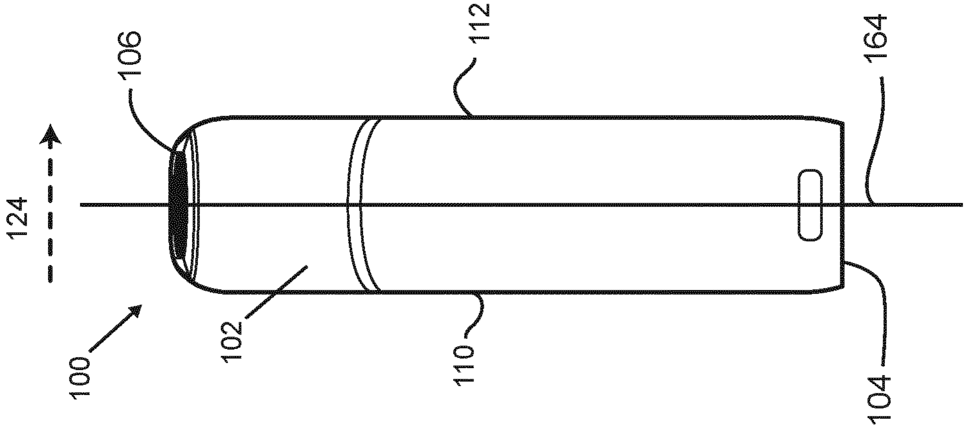
FIG. 4 is a side elevation of an aerosol-generating device according to the present invention showing a third plane.

In a preferred embodiment, the shape of the housing 102 is substantially symmetrical across the third plane 164 (that is, the portion on the left of the plane 164 in FIG. 4 is symmetrical to the portion on the right of the plane 164 in FIG. 4). The inventors have found that users may find a device 100 which is configured to be symmetrical in this manner may be held more comfortably in the hand. In a further embodiment, the shape of the housing 102 is preferably asymmetrical across the second plane 162 and the first plane 160. In particular, it is preferable that the extent of the device in the third direction 124 is not constant along the second direction 122 of the housing 102. Again, the inventors have found that users may find a device 100 which is configured to be asymmetrical in this manner may be held more comfortably in the hand.

Figure 6B:
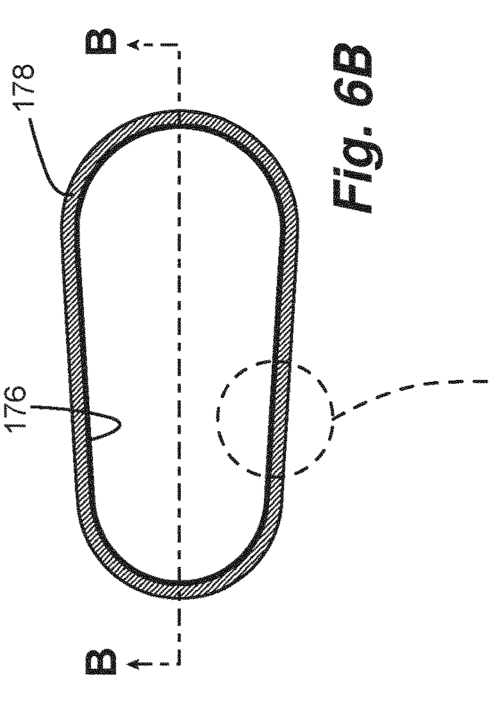
FIG. 6B is a bottom elevation of the body portion shown in FIG. 6A.
Figure 6C:
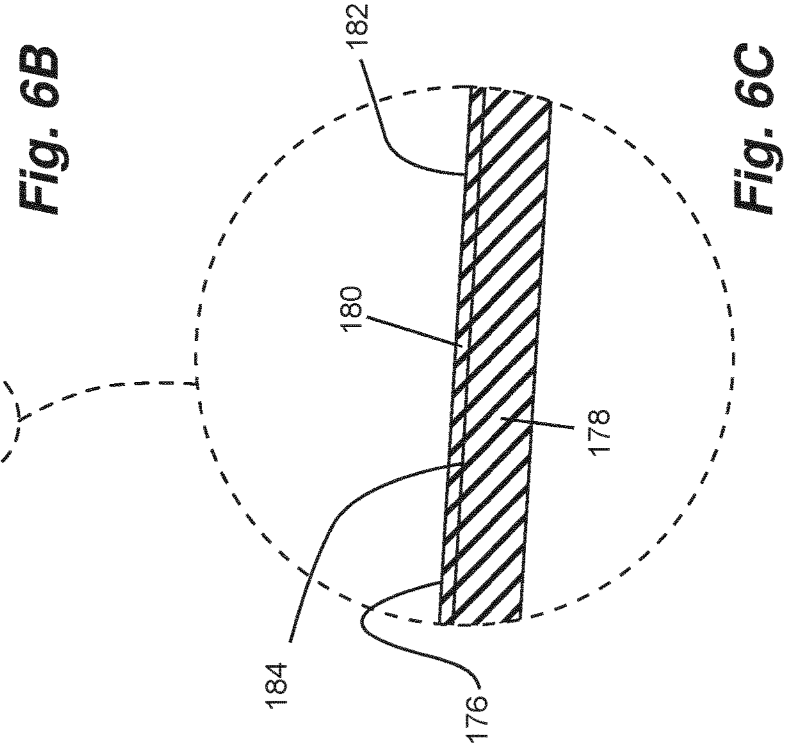
FIG. 6C is an enlargement of a portion of FIG. 6B.
Figure 6A:
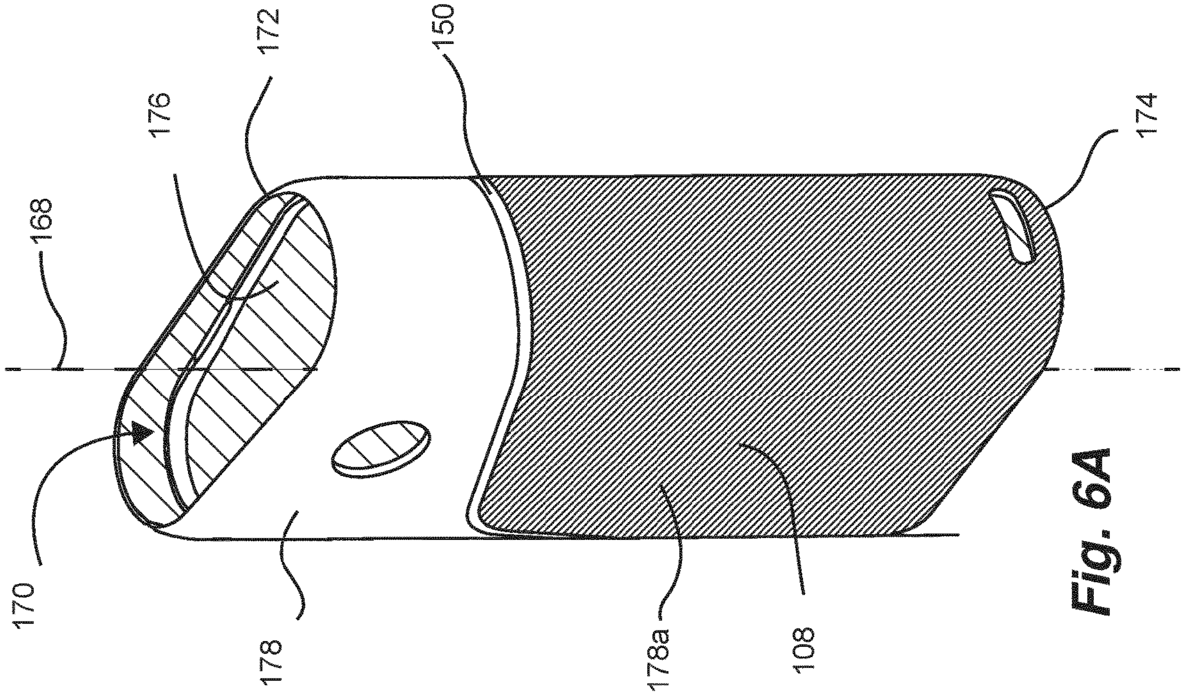
FIG. 6A is a perspective view of a body portion of a housing provided with a soft touch coating.

FIGS. 6A-6C shows another aspect of the present invention: the body portion 108 of the housing 102. A portion of the body portion 108 (and thus, a portion of the housing 102) has a soft touch coating, indicated by close-spaced shading. FIG. 6A is a perspective view of the body portion 108; FIG. 6B is a bottom elevation of the housing 102; FIG. 6C is an enlargement of a portion of FIG. 6B.

The body portion defines a substantially tubular element. That is, the body portion defines a lumen 170 which extends along an axis 168. The axis 168 lies in the first direction 120. The housing has a first end 172 and second end 174; the housing is open at both the first and second end 172, 174. In another embodiment (not shown), the tubular element may only be open at one end. For example, the body element 108 may comprise a top portion covering the opening at the first end 172 such that the body element defines a chamber having a single opening at the second end 174. Preferably, though, the body portion 108 is open at both ends 172, 174 as shown in the Figures. This embodiment may be particularly suitable for modular assembly of the device 100—the body portion 108 being open at both ends may allow for a simpler assembly process, such as when providing the heating assembly within the housing 102.

When the body portion 108 is arranged as part of the housing 102 in the device 100, the base 104 and top face 106 are preferably arranged to close the openings at the first and second ends 172, 174 of the body portion 108. In some examples, the base 104 and or top face 106 include a soft touch coating. In a preferred example, at least one of the base 104 and the top face 106 do not include a soft touch coating. In a particular example, neither the base 104 nor the top face 196 includes a soft touch coating.

The body portion comprises an inner surface 176. The inner surface 176 faces the axis 168, and is an "inner" surface in the sense that it faces the internal parts of the device. The inner surface 176 is depicted by wide-spaced shading.

The body portion also comprises an outer surface 178. The outer surface 178 faces in a direction opposite to the inner surface 176 and the axis 168, and is "outer" in the sense that it faces the environment external to the device 100. Preferably, as shown by the close-line shading, at least some of the soft touch coating is disposed on a portion 178*a* of the outer surface 178, as this is the part of the body portion 108 which a user will most easily handle in order to experience the soft touch sensation. The entire outer surface 178 is preferably not coated. Rather, it is preferred that the coated portion 178*a* makes up from 10% to 90% of the outer surface 178 by surface area, preferably from 20% to 85%, more preferably from 30% to 80%, more preferably still from 40% to 75%, and most preferably from 45% to 70%. In some examples, the coated portion 178*a* makes up at least 15%, 20%, 25%, 30%, 35%, 40%, 45%, 50%, 55%, 60%, 65%, 75%, 80%, or 85% of the outer surface 178 by surface area. In some examples, the coated portion 178*a* makes up less than 85%, 80%, 75%, 70%, 65%, 60%, 55%, 50%, 45%, 40%, 35%, 30%, 25%, 20%, or 15% of the outer surface 178 by surface area.

In a preferred embodiment, the body portion 108 is a monolithic element. That is, it is formed of a single continuous piece of material, and is not modular. In another embodiment, though, the body portion 108 may be formed of a plurality of modular parts.

The body portion 108 comprises a connecting face 180. The connecting face 180 is a face which connects the inner surface 176 to the outer surface 178. Preferably, the connecting surface is arranged along an entire edge of each of the inner surface 176 and the outer surface 178. Depending on where the connecting face 180 is arranged, it may be referred to as a top face 180 of the body portion 108 (when the connecting surface 180 is arranged at the first end 172 of the body portion 108), or a bottom face 180 of the body portion 108 (when the connecting face is arranged at the second end 174), Preferably, as shown in the Figures, the connecting face 180 is a bottom face 180.

The connecting face 180 is preferably substantially planar. As shown in the Figures, the connecting face 180 is substantially planar and extends across the first plane 160 (i.e. is perpendicular to the first direction 120). Advantageously, arranging the connecting face 180 in this manner may provide a stable base to the device 100. In a particularly preferred embodiment, when the body portion 108 is arranged as part of the housing 102 in the device 100, the base 104 and the connecting face 180 are arranged such that together they provide a bottom surface to the device. More preferably still, the base 104 and body portion 108 may be arranged such that the connecting face 180 stands proud of the base 104. That is, the body portion 108 extends in the first direction 120 beyond the external surface of the base 104 such that, if the device is placed on a planar surface which extends in the first plane 160, the base 104 does not directly contact the surface; rather the device 100 is configured such that only the connecting face 180 touches the surface when the device 100 is rested on the surface which extends in the first plane 160. This may allow for a reduction in scratches and abrasion of the base 104, and/or reduce stress on components in the base 104.

As most clearly shown in FIG. 6C, the connecting face 180 is connected to the inner surface 176 by an inner edge 182. The connecting face 180 is connected to the outer face 178 by an outer edge 184.

Figures 7A, 7B, 7C:
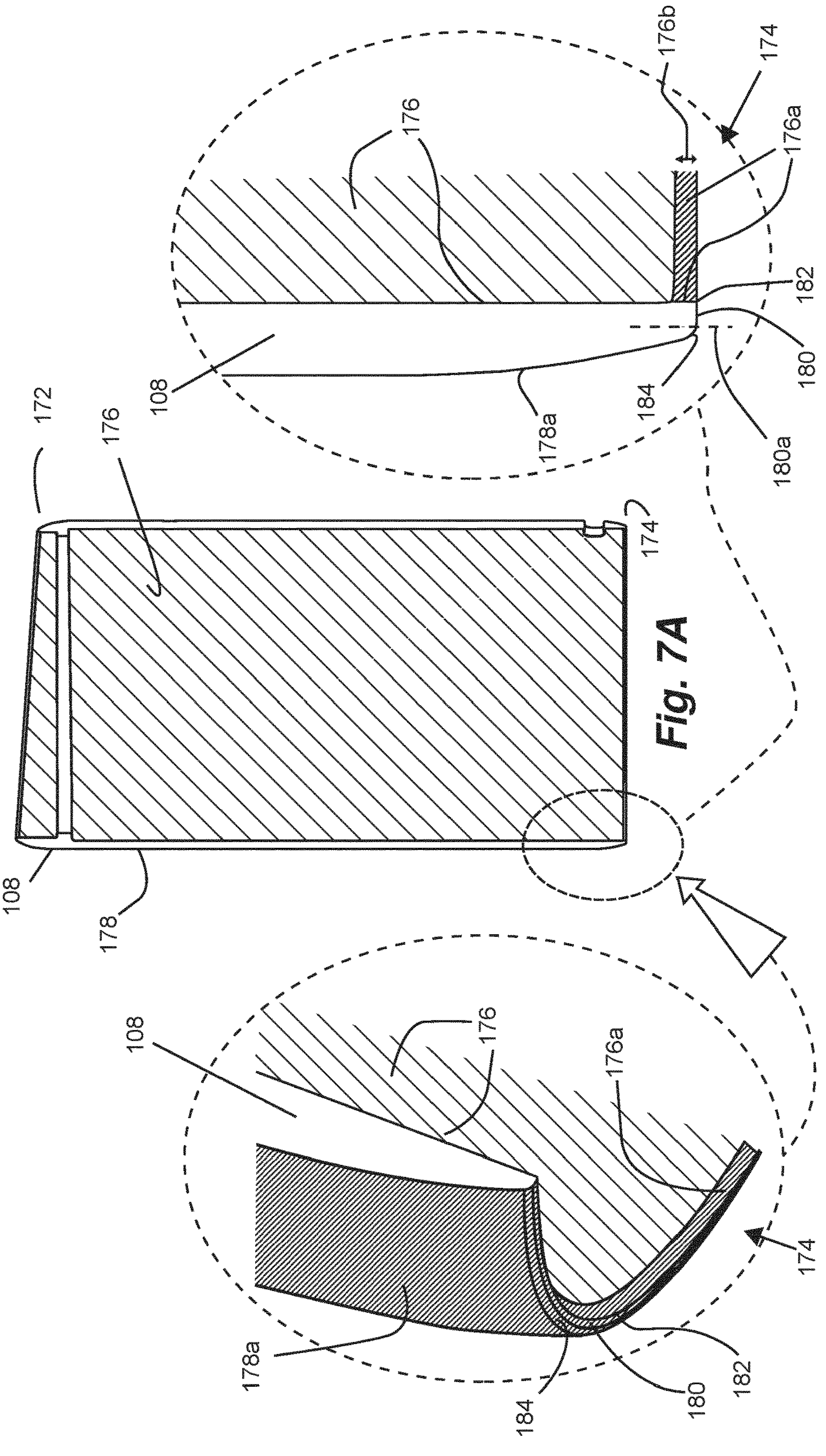
FIG. 7A is a sectional view of the body portion taken along the plane B-B defined in FIG. 6B.
FIG. 7B is an enlargement of a portion of FIG. 7A.
FIG. 7C is an enlarged bottom, front, second side perspective view of the section shown in FIG. 7A.

FIG. 7A is a sectional view of the body portion 108 taken along the plane B-B shown in FIG. 6B; FIG. 7B is an enlargement of a portion of FIG. 7A; FIG. 7C is an enlarged perspective view of the section shown in FIG. 7A, the perspective view taken along the wedged arrow (i.e. a bottom, front, second side view of the section shown in FIG. 7A).

As most clearly shown in FIG. 7B, the inner edge 182 connects the inner surface 176 and the connecting face 180 by a sharp corner; preferably, the inner edge 182 forms a right-angle between the inner surface 176 and the connecting surface 180. The angle formed by the inner edge 182 is preferably constant all the way around the inner surface. For example, the inner edge 182 preferably forms a right-angle around the entire body portion 108. In another embodiment (not shown), the inner edge 182 does not form a right angle; rather, connecting surface 180 extends along the first plane 160 and is connected to a portion of the inner surface 176 arranged such that the inner edge forms an obtuse angle. Put another way, the portion of the inner surface 176 which is connected to the connecting face 180 may slope from the inner edge 182 towards the axis 168.

The outer edge 184 connects the outer surface 178 and the connecting face 180 by a rounded corner. A rounded corner may provide a more desirable feel to a use. Moreover, the inventors have found that forming the outer edge 184 as a rounded edge may reduce delamination of a soft touch coating disposed on the outer surface 178.

The soft touch coating may be disposed on portions of the outer surface 178, the inner surface 176, the connecting face 180, the inner edge 182 and/or the outer edge 184. As shown in FIGS. 7B and 7C, the portion of the body portion 108 having a soft touch coating is preferably a continuous portion including a portion 178*a* of the outer surface 178, a portion of the connecting face 180, and a portion of the outer edge 184; in a particularly preferred embodiment, the soft touch coating covers the entire connecting face 180 and outer edge 184. The inventors have found that by arranging the soft touch coating to extend along a portion of the outer surface 178*a*, the outer edge 184 and the connecting face 180 may reduce delamination of the soft touch coating. Without wishing to be bound by theory, it is believed that extending the coating past the edge and onto the connecting face 180 reduces the opportunity for an edge of the coating to be caught on an external element and begin to peel away from the surface of the body portion 108.

Further, the continuous portion preferably extends along a portion of the inner edge 182 and a portion of the inner surface 176. For example, the continuous portion preferably extends along portions of the outer surface 178, the outer edge 184, the connecting face 180, the inner face 182, and the inner surface 176. In a particularly preferred embodiment, the continuous portion extends along the entire inner edge 182, and a portion 176*a* of the inner surface 176. The portion 176*a* of the inner surface having the soft touch coating preferably has an extent 176*b* from the inner edge 182 along the inner surface 176 in the first direction 120 of from 0.5 to 3 mm, preferably 1 to 2 mm. The boundary between the portion 176*a* and the rest of the inner surface 176 may be conveniently referred to as an "end" of the coated portion. Preferably, the coated portion extends along the portion 176*a* of the inner surface 176 around the entire opening at the second end 174.

In a particularly preferred embodiment of the device 100, the body portion 108 having the inner coating 176*a* as described immediately above is arranged with the base 104 such that the base 104 abuts the portion 176*a* of the inner surface 176 having the soft touch coating. In particular, the device is configured such that the end of the coated portion is disposed within the device such that it cannot be accessed by a user in normal user. Surprisingly, in this way, the user is discouraged from peeling the soft touch coating away from the body portion 108, thus reducing the risk of delamination of the soft touch coating. An extent 176*b* of from 0.5 to 3 mm has been found to be a particularly advantageous extend in that the end of the coated portion is sufficiently far away from the outside of the device 100 and manufacturing costs are kept as low as possible (as an unnecessarily large coating of the inner surface 176 which is not accessible by the end user is avoided).

This coated body portion may be manufactured by supplying a soft touch coating precursor to the portion which is to have the soft touch coating, and treating the soft touch coating precursor to provide a soft touch coating to the continuous portion. For example, the precursor may be supplied to a continuous portion extending along a portion 178*a* of the outer surface 178, the outer edge 184, the connecting face 180, the inner edge 182, and a portion 176*a* of the inner surface 176.

The shortest distance between the inner edge 182 and the outer edge 184 at any point around the body portion 108 may conveniently be referred to as the width of the connecting face 180. The width of the connecting face is preferably substantially constant around the entire body portion 108. As defined herein, the width extends between the points at which the planar characteristic of the connecting face 180 ends. In embodiments wherein an edge is a substantially sharp edge (for example, the inner edge 182), the width may suitable by measured from the sharp edge. In embodiments wherein an edge is a rounded edge (for example, the outer edge 184) the connecting face is considered to comprise only the planar portion; the edge is deemed to extend from the point at which the curvature of the rounded corner begins. Thus, for the example shown in FIG. 7B, the width of the connecting face 180 at any point around the body portion 108 is the shortest distance between the sharp corner 182 and the external end of the planar characteristic of the connecting face 180*a*. Preferably, the width of the connecting face 180 is substantially constant around the body portion 108 and is from 0.5 mm to 5 mm, preferably from 0.5 mm to 2 mm, more preferably from 0.5 mm to 1 mm, suitably approximately 75 mm. The present inventors have found that a width of this size provides a significant reduction in coating delamination and a greater peeling resistance than corresponding body portions having a smaller or larger connecting face 180 width.

Where the outer surface 178 is coplanar with the inner surface 176 (e.g. along portions where there is a substantially constant shortest distance between the outer surface 178 and the inner surface 176, not where the outer surface 178 tapers towards the inner surface 176), the average shortest distance between the outer surface 178 and the inner surface (e.g. the thickness of the housing) is typically from about 0.8 to about 1.6 mm (the average being the mean of all measurements taken around the housing). In one example, the average thickness is approximately 0.975 mm. In another example, the average thickness is approximately 1.5 mm. Advantageously, this example with the greater thickness may have a lower outer surface 178 temperature during operation.

The connecting face 180 may have a characteristic shape. The characteristic shape may correspond to a characteristic shape of a cross section of the body portion 108 taken through the first plane 160.

FIG. 8A depicts a suitable characteristic shape of the connecting face 180. The characteristic shape has a shape 190*a* forming an outer edge of the characteristic shape ("the outer shape 190*a*"), and a shape 190*b* forming an inner edge of the characteristic shape ("the inner shape 190*b*"). In the context of the present invention, such a shape may be referred to as an annulus. For the avoidance of doubt, the definition of annulus extends beyond substantially circular shapes according to the present disclosure.

The inner shape 190*b* suitably corresponds to the inner edge 182. The outer shape 190*a* suitable corresponds to the furthest extent of the connecting face 180, which is the point at which the outer edge 184 ends (i.e. corresponding to the extent 180*a* shown in FIG. 7B).

Preferably, as shown in FIG. 8A, the outer and inner shapes 190*a*, 190*b* are concentric. That is, they share the same centre point 186.

In one embodiment, both the outer shape 190*a* and inner shape 190*b* may be characterized as a combination of regular two-dimensional shapes. For example, each shape 190*a*, 190*b* may be formed from an isosceles trapezoid 192 in combination with a first convex portion 194 and second convex portion 196, as shown in FIGS. 8B to 8D. Each shape 190*a*, 190*b* will necessarily have parameters differing from the other, but the following description can apply separately to each shape apart from where indicated otherwise.

Isosceles trapezoid 192 forms the center portion of the shape, and contains the internal angles $\alpha$ and $\beta$: $\alpha=\alpha$, $\beta=\beta$, and $\alpha\neq\beta$. The height h of the isosceles trapezoid 192*a* is preferably not more than 25 mm. The height h may be more than 10 mm, 15 mm, or 20 mm. Suitably, the height h of the trapezoid 192 is approximately 24 mm.

A trapezoid has a pair of parallel sides (the "bases") and a pair of non-parallel sides (the "legs"). The legs of trapezoid 192 are equal in length; base a is longer than base b.

The first convex portion 194 is arranged across the entirety of base a. That is, the base of the convex portion 194 has the same length as base a. Preferably, as shown, the first convex portion 194 is substantially semi-circular. In this embodiment, the convex portion 194 has a radius $r_1$, and $a=2r_1$.

The radius $r_1$ of the semi-circular first convex portion 194*a* is not more than 12 mm. The radius $r_1$ may be more than 5 mm, 8 mm or 10 mm. Suitably, the radius $r_1$ is between 10 mm and 11 mm. Hence, base a is not more than 24 mm, and is suitably approximately 23 mm.

The second convex portion 196 is arranged across the entirety of base b. That is, the base of the convex portion 196 has the same length as base b. Thus, $b=2r_2$. Preferably, as shown, the second convex portion 196 is substantially semi-circular. In this embodiment, the convex portion 196 has a radius $r_2$, and $b=2r_2$.

The radius $r_2$ of the semi-circular second convex portion 196*a* is not more than 11 mm. The radius $r_2$ may be more than 5 mm, 7 mm or 9 mm. Suitably, the radius $r_2$ is approximately 9 mm. Hence, base b is not more than 22 mm, and is suitably approximately 18 mm.

Preferably, where the characteristic shape is an annulus, the width 188 of the annulus (i.e. the shortest distance between the outer shape 190*a* and inner shape 190*b* at each point around the annulus) is substantially constant around the entire annulus. In instances such as those depicted in the figures where the characteristic shape is not substantially circular, this will mean that the outer shape 190*a* and 190*b* are incongruent—they do not have the same proportional of side lengths and internal angles. The width is preferably from 0.5 mm to 5 mm.

Figure 9B:
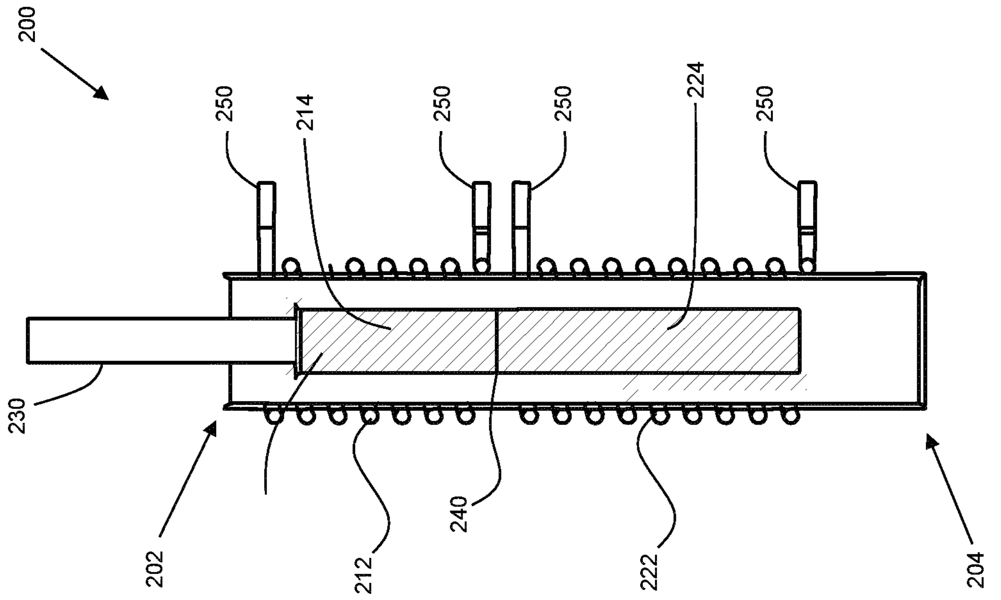
FIG. 9B is a sectional view of the heating assembly.
Figure 9A:
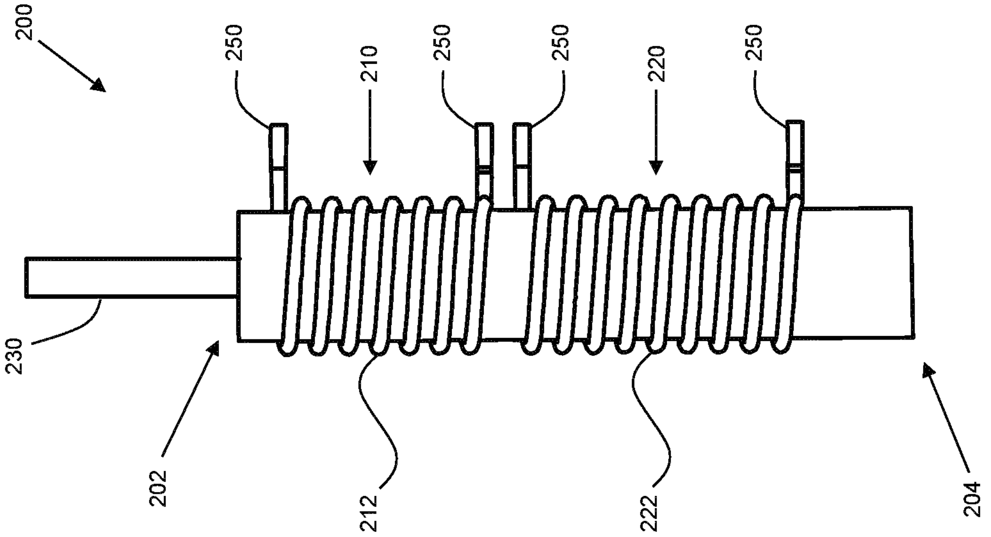
FIG. 9A is a front elevation of a heating assembly arranged in the aerosol-generating device of the present invention.

FIG. 9A shows an induction heating assembly 200 of an aerosol-generating device according to the present invention; FIG. 1B shows a cross section of the induction heating assembly 200 of the device.

The heating assembly 200 has a first or proximal or mouth end 202, and a second or distal end 204. In use, the user will inhale the formed aerosol from the mouth end of the aerosol-generating device. The mouth end may be an open end.

The heating assembly 200 comprises a first induction heating unit 210 and a second induction heating unit 220. The first induction heating unit 210 comprises a first inductor coil 212 and a first heating element 214. The second induction heating unit 220 comprises a second inductor coil 222 and a second heating element 224.

FIGS. 9A and 9B show a smoking article 230 received within a susceptor 240. The susceptor 240 forms the first induction heating element 214 and the second induction heating element 224. The susceptor 240 may be formed from any material suitable for heating by induction. For example, the susceptor 240 may comprise metal. In some embodiments, the susceptor 240 may comprise non-ferrous metal such as copper, nickel, titanium, aluminium, tin, or zinc, and/or ferrous material such as iron, nickel or cobalt. Additionally, or alternatively the susceptor 240 may comprise a semiconductor such as silicon carbide, carbon or graphite.

Each induction heating element present in the aerosol-generating device may have any suitable shape. In the embodiment shown in FIG. 9B, the induction heating elements 214, 224 define a receptacle to surround an aerosol-generating article and heat the aerosol-generating article externally. In other embodiments (not shown), one or more induction heating elements may be substantially elongate, arranged to penetrate an aerosol-generating article and heat the aerosol-generating article internally.

As shown in FIG. 9B, the first induction heating element 214 and second induction heating element 224 may be provided together as a monolithic element 240. That is, in some embodiments, there is no physical distinction between the first 214 and second 224 heating elements. Rather, the differing characteristics between the first and second heating units 210, 220 are defined by separate inductor coils 212, 222 surrounding each induction heating element 214, 224, so that they may be controlled independently from each other. In other embodiments (not depicted), physically distinct inductive heating elements may be employed.

The first and second inductor coils 212, 222 are made from an electrically conducting material. In this example, the first and second inductor coils 212, 222 are made from Litz wire/cable which is wound in a helical fashion to provide helical inductor coils 212, 222. Litz wire comprises a plurality of individual wires which are individually insulated and are twisted together to form a single wire. Litz wires are designed to reduce the skin effect losses in a conductor. In the example induction heating assembly 200, the first and second inductor coils 224, 226 are made from copper Litz wire which has a circular cross section. In other examples the Litz wire can have other shape cross sections, such as rectangular.

The first inductor coil 212 is configured to generate a first varying magnetic field for heating the first induction heating element 214, and the second inductor coil 222 is configured to generate a second varying magnetic field for heating a second section of the susceptor 224. The first inductor coil 212 and the first induction heating element 214 taken together form a first induction heating unit 210. Similarly, the second inductor coil 222 and the second induction heating element 224 taken together form a second induction heating unit 220.

In this example, the first inductor coil 212 is adjacent to the second inductor coil 222 in a direction along the longitudinal axis of the device heating assembly 200 (that is, the first and second inductor coils 212, 222 do not overlap). The susceptor arrangement 240 may comprise a single susceptor. Ends 250 of the first and second inductor coils 212, 222 can be connected to a controller such as a PCB (not shown). The PCB is preferably arranged to extend along the first plane. That is, the smallest extent of the PCB is in the first direction. This arrangement may allow for a device with a smaller extent in the first direction than a comparable device comprising a PCB arranged to have its greatest extend in the first direction. A smaller extent in the first direction may allow a user to more easily interact with the sliding door arranged on the top of the device while holding the device in one hand. In preferred embodiments, the controller comprises a PID controller (proportional integral derivative controller).

The varying magnetic field generates eddy currents within the first inductive heating element 214, thereby rapidly heating the first induction heating element 214 to a maximum operating temperature within a short period of time from supplying the alternative current to the coil 212, for example within 20, 15, 12, 10, 5, or 2 seconds. Arranging the first induction heating unit 210 which is configured to rapidly reach a maximum operating temperature closer to the mouth end 202 of the heating assembly 200 than the second induction heating unit 220 may mean that an acceptable aerosol is provided to a user as soon as possible after initiation of a session of use.

It will be appreciated that the first and second inductor coils 212, 222, in some examples, may have at least one characteristic different from each other. For example, the first inductor coil 212 may have at least one characteristic different from the second inductor coil 222. More specifically, in one example, the first inductor coil 212 may have a different value of inductance than the second inductor coil 222. In FIGS. 9A and 9B, the first and second inductor coils 212, 222 are of different lengths such that the first inductor coil 212 is wound over a smaller section of the susceptor 240 than the second inductor coil 222. Thus, the first inductor coil 212 may comprise a different number of turns than the second inductor coil 222 (assuming that the spacing between individual turns is substantially the same). In yet another example, the first inductor coil 212 may be made from a different material to the second inductor coil 222. In some examples, the first and second inductor coils 212, 222 may be substantially identical.

In this example, the first inductor coil 212 and the second inductor coil 222 are wound in the same direction. However, in another embodiment, the inductor coils 212, 222 may be wound in opposite directions. This can be useful when the inductor coils are active at different times. For example, initially, the first inductor coil 212 may be operating to heat the first induction heating element 214, and at a later time, the second inductor coil 222 may be operating to heat the second induction heating element 224. Winding the coils in opposite directions helps reduce the current induced in the inactive coil when used in conjunction with a particular type of control circuit. In one example, the first inductor coil 212 may be a right-hand helix and the second inductor coil 222 a left-hand helix. In another example, the first inductor coil 212 may be a left-hand helix and the second inductor coil 222 may be a right-hand helix.

The coils 212, 222 may have any suitable geometry. Without wishing to be bound by theory, configuring an induction heating element to be smaller (e.g. smaller pitch helix; fewer revolutions in the helix; shorter overall length of the helix), may increase the rate at which the induction heating element can reach a maximum operating temperature. In some embodiments, the first coil 212 may have a length of less than approximately 20 mm, less than 18 mm, less than 16 mm, or a length of approximately 14 mm, in the longitudinal direction of the heating assembly 200. Preferably, the first coil 212 may have a length shorter than the second coil 224 in the longitudinal direction of the heating assembly 200. Such an arrangement may provide asymmetrical heating of the aerosol-generating article along the length of the aerosol-generating article.

The susceptor 240 of this example is hollow and therefore defines a receptacle within which aerosol-generating material is received. For example, the article 230 can be inserted into the susceptor 240. In this example the susceptor 240 is tubular, with a circular cross section.

The induction heating elements 214 and 224 are arranged to surround the smoking article 230 and heat the smoking article 230 externally. The aerosol-generating device is configured such that, when the smoking article 230 is received within the susceptor 240, the outer surface of the article 230 abuts the inner surface of the susceptor 240. This ensures that the heating is most efficient. The article 230 of this example comprises aerosol-generating material. The aerosol-generating material is positioned within the susceptor 240. The article 230 may also comprise other components such as a filter, wrapping materials and/or a cooling structure.

The heating assembly 200 is not limited to two heating units. In some examples, the heating assembly 200 may comprise three, four, five, six, or more than six heating units. These heating units may each be controllable independent from the other heating units present in the heating assembly 200.

Figure 10A:
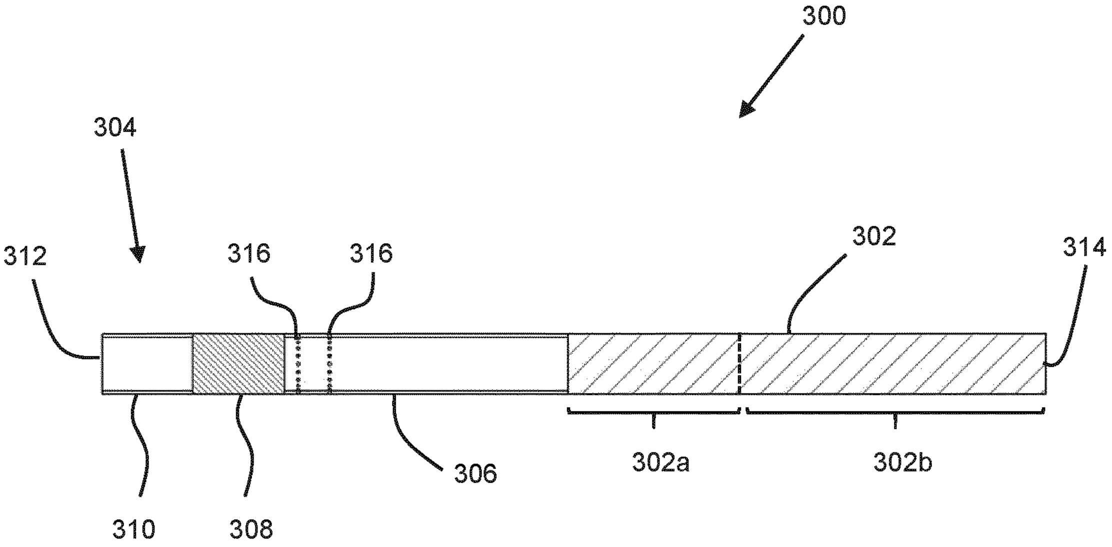
FIG. 10A is a schematic cross-section of an aerosol-generating article for use with the aerosol-generating device of the present invention.
Figure 10B:
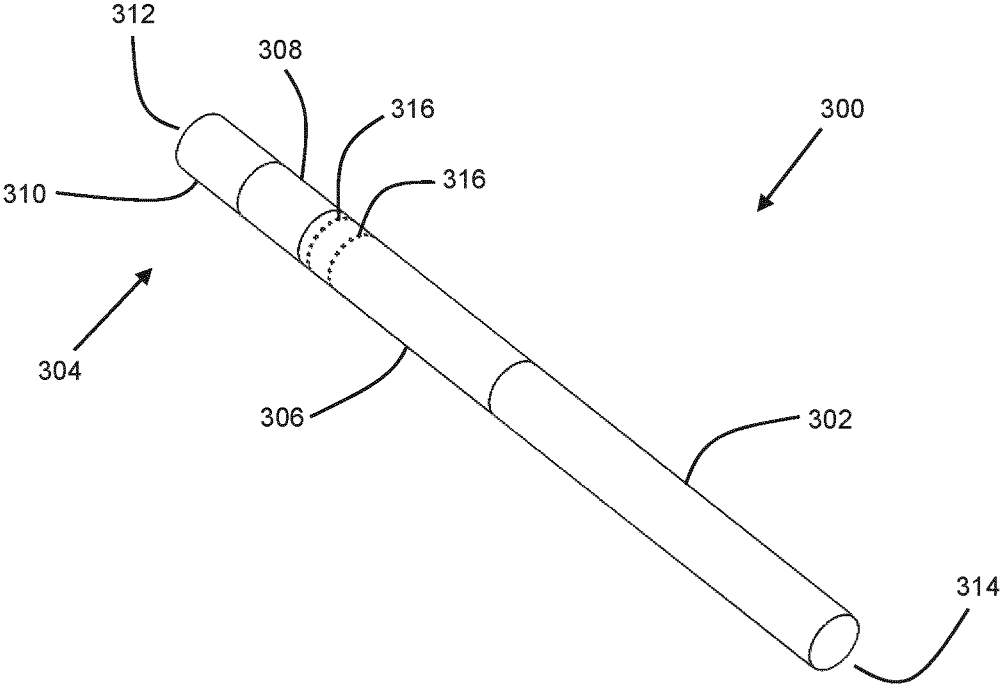
FIG. 10B is a perspective view of the aerosol-generating article.

Referring to FIGS. 10A and 10B, there is shown a partially cut-away section view and a perspective view of an example of an aerosol-generating article 300. The aerosol-generating article 300 shown in FIGS. 10A and 10B corresponds to the aerosol-generating article 230 shown in FIGS. 9A and 9B.

The aerosol-generating article 300 may be any shape suitable for use with an aerosol-generating device. The smoking article 300 may be in the form of or provided as part of a cartridge or cassette or rod which can be inserted into the apparatus. In the embodiment shown in FIGS. 9A and 9B, the smoking article 300 is in the form of a substantially cylindrical rod that includes a body of smokable material 302 and a filter assembly 304 in the form of a rod. The filter assembly 304 includes three segments, a cooling segment 306, a filter segment 308 and a mouth end segment 310. The article 300 has a first end 312, also known as a mouth end or a proximal end and a second end 314, also known as a distal end. The body of aerosol-generating material 302 is located towards the distal end 314 of the article 300. In one example, the cooling segment 306 is located adjacent the body of aerosol-generating material 302 between the body of aerosol-generating material 302 and the filter segment 308, such that the cooling segment 306 is in an abutting relationship with the aerosol-generating material 302 and the filter segment 308. In other examples, there may be a separation between the body of aerosol-generating material 302 and the cooling segment 306 and between the body of aerosol-generating material 302 and the filter segment 308. The filter segment 308 is located in between the cooling segment 306 and the mouth end segment 310. The mouth end segment 310 is located towards the proximal end 312 of the article 300, adjacent the filter segment 308. In one example, the filter segment 308 is in an abutting relationship with the mouth end segment 310. In one embodiment, the total length of the filter assembly 304 is between 37 mm and 45 mm, more preferably, the total length of the filter assembly 304 is 41 mm.

In use, portions 302*a* and 302*b* of the body of aerosol-generating material 302 may correspond to the first induction heating element 214 and second induction heating element 224 of the portion 200 shown in FIG. 9B respectively.

The body of smokable material may have a plurality of portions 302*a*, 302*b* which correspond to the plurality of induction heating elements present in the aerosol-generating device. For example, the aerosol-generating article 300 may have a first portion 302*a* which corresponds to the first induction heating element 214 and a second portion 302*b* which corresponds to the second induction heating element 224. These portions 302*a*, 302*b* may exhibit temperature profiles which are different from each other during a session of use; the temperature profiles of the portions 302*a*, 302*b* may derive from the temperature profiles of the first induction heating element 214 and second induction heating element 224 respectively.

Where there is a plurality of portions 302*a*, 302*b* of a body of aerosol-generating material 302, any number of the substrate portions 302*a*, 302*b* may have substantially the same composition. In a particular example, all of the portions 302*a*, 302*b* of the substrate have substantially the same composition. In one embodiment, body of aerosol-generating material 302 is a unitary, continuous body and there is no physical separation between the first and second portions 302*a*, 302*b*, and the first and second portions have substantially the same composition.

In one embodiment, the body of aerosol-generating material 302 comprises tobacco. However, in other respective embodiments, the body of smokable material 302 may consist of tobacco, may consist substantially entirely of tobacco, may comprise tobacco and aerosol-generating material other than tobacco, may comprise aerosol-generating material other than tobacco, or may be free of tobacco. The aerosol-generating material may include an aerosol generating agent, such as glycerol.

In a particular embodiment, the aerosol-generating material may comprise one or more tobacco components, filler components, binders and aerosol generating agents.

The filler component may be any suitable inorganic filler material. Suitable inorganic filler materials include, but are not limited to: calcium carbonate (i.e. chalk), perlite, vermiculite, diatomaceous earth, colloidal silica, magnesium oxide, magnesium sulphate, magnesium carbonate, and suitable inorganic sorbents, such as molecular sieves. Calcium carbonate is particularly suitable. In some cases, the filler comprises an organic material such as wood pulp, cellulose and cellulose derivatives.

The binder may be any suitable binder. In some embodiments, the binder comprises one or more of an alginate, celluloses or modified celluloses, polysaccharides, starches or modified starches, and natural gums.

Suitable binders include, but are not limited to: alginate salts comprising any suitable cation, such as sodium alginate, calcium alginate, and potassium alginate; celluloses or modified celluloses, such as hydroxypropyl cellulose and carboxymethylcellulose; starches or modified starches;

polysaccharides such as pectin salts comprising any suitable cation, such as sodium, potassium, calcium or magnesium pectate; xanthan gum, guar gum, and any other suitable natural gums.

A binder may be included in the aerosol-generating material in any suitable quantity and concentration.

The "aerosol-generating agent" is an agent that promotes the generation of an aerosol. An aerosol-generating agent may promote the generation of an aerosol by promoting an initial vaporisation and/or the condensation of a gas to an inhalable solid and/or liquid aerosol. In some embodiments, an aerosol-generating agent may improve the delivery of flavour from the smoking article.

In general, any suitable aerosol-generating agent or agents may be included in the aerosol-generating material. Suitable aerosol-generating agent include, but are not limited to: a polyol such as sorbitol, glycerol, and glycols like propylene glycol or triethylene glycol; a non-polyol such as monohydric alcohols, high boiling point hydrocarbons, acids such as lactic acid, glycerol derivatives, esters such as diacetin, triacetin, triethylene glycol diacetate, triethyl citrate or myristates including ethyl myristate and isopropyl myristate and aliphatic carboxylic acid esters such as methyl stearate, dimethyl dodecanedioate and dimethyl tetradecanedioate.

In a particular embodiment, the aerosol-generating material comprises a tobacco component in an amount of from 60 to 90% by weight of the tobacco composition, a filler component in an amount of 0 to 20% by weight of the tobacco composition, and an aerosol generating agent in an amount of from 10 to 20% by weight of the tobacco composition. The tobacco component may comprise paper reconstituted tobacco in an amount of from 70 to 100% by weight of the tobacco component.

In one example, the body of aerosol-generating material 302 is between 34 mm and 50 mm in length, more preferably, the body of aerosol-generating material 302 is between 38 mm and 46 mm in length, more preferably still, the body of aerosol-generating material 302 is 42 mm in length.

In one example, the total length of the article 300 is between 71 mm and 95 mm, more preferably, total length of the article 300 is between 79 mm and 87 mm, more preferably still, total length of the article 300 is 83 mm.

An axial end of the body of aerosol-generating material 302 is visible at the distal end 314 of the article 300. However, in other embodiments, the distal end 314 of the article 300 may comprise an end member (not shown) covering the axial end of the body of aerosol-generating material 302.

The body of aerosol-generating material 302 is joined to the filter assembly 304 by annular tipping paper (not shown), which is located substantially around the circumference of the filter assembly 304 to surround the filter assembly 304 and extends partially along the length of the body of aerosol-generating material 302. In one example, the tipping paper is made of 58GSM standard tipping base paper. In one example has a length of between 42 mm and 50 mm, and more preferably, the tipping paper has a length of 46 mm.

In one example, the cooling segment 306 is an annular tube and is located around and defines an air gap within the cooling segment. The air gap provides a chamber for heated volatilised components generated from the body of aerosol-generating material 302 to flow. The cooling segment 306 is hollow to provide a chamber for aerosol accumulation yet rigid enough to withstand axial compressive forces and bending moments that might arise during manufacture and whilst the article 300 is in use during insertion into the device 100. In one example, the thickness of the wall of the cooling segment 306 is approximately 0.29 mm.

The cooling segment 306 provides a physical displacement between the aerosol-generating material 302 and the filter segment 308. The physical displacement provided by the cooling segment 306 will provide a thermal gradient across the length of the cooling segment 306. In one example the cooling segment 306 is configured to provide a temperature differential of at least 40° C. between a heated volatilised component entering a first end of the cooling segment 306 and a heated volatilised component exiting a second end of the cooling segment 306. In one example the cooling segment 306 is configured to provide a temperature differential of at least 60° C. between a heated volatilised component entering a first end of the cooling segment 306 and a heated volatilised component exiting a second end of the cooling segment 306. This temperature differential across the length of the cooling element 306 protects the temperature sensitive filter segment 308 from the high temperatures of the aerosol-generating material 302 when it is heated by the heating assembly 200 of the device aerosol-generating device. If the physical displacement was not provided between the filter segment 308 and the body of aerosol-generating material 302 and the heating elements 214, 224 of the heating assembly 200, then the temperature sensitive filter segment 308 may become damaged in use, so it would not perform its required functions as effectively.

In one example the length of the cooling segment 306 is at least 15 mm. In one example, the length of the cooling segment 306 is between 20 mm and 30 mm, more particularly 23 mm to 27 mm, more particularly 25 mm to 27 mm and more particularly 25 mm.

The cooling segment 306 is made of paper, which means that it is comprised of a material that does not generate compounds of concern, for example, toxic compounds when in use adjacent to the heater assembly 100 of the aerosol-generating device. In one example, the cooling segment 306 is manufactured from a spirally wound paper tube which provides a hollow internal chamber yet maintains mechanical rigidity. Spirally wound paper tubes are able to meet the tight dimensional accuracy requirements of high-speed manufacturing processes with respect to tube length, outer diameter, roundness and straightness.

In another example, the cooling segment 306 is a recess created from stiff plug wrap or tipping paper. The stiff plug wrap or tipping paper is manufactured to have a rigidity that is sufficient to withstand the axial compressive forces and bending moments that might arise during manufacture and whilst the article 300 is in use during insertion into the device 100.

For each of the examples of the cooling segment 306, the dimensional accuracy of the cooling segment is sufficient to meet the dimensional accuracy requirements of high-speed manufacturing process.

The filter segment 308 may be formed of any filter material sufficient to remove one or more volatilised compounds from heated volatilised components from the smokable material. In one example the filter segment 308 is made of a mono-acetate material, such as cellulose acetate. The filter segment 308 provides cooling and irritation-reduction from the heated volatilised components without depleting the quantity of the heated volatilised components to an unsatisfactory level for a user.

The density of the cellulose acetate tow material of the filter segment 308 controls the pressure drop across the filter segment 308, which in turn controls the draw resistance of the article 300. Therefore the selection of the material of the filter segment 308 is important in controlling the resistance to draw of the article 300. In addition, the filter segment 308 performs a filtration function in the article 300.

In one example, the filter segment 308 is made of a 8Y15 grade of filter tow material, which provides a filtration effect on the heated volatilised material, whilst also reducing the size of condensed aerosol droplets which result from the heated volatilised material which consequentially reduces the irritation and throat impact of the heated volatilised material to satisfactory levels.

The presence of the filter segment 308 provides an insulating effect by providing further cooling to the heated volatilised components that exit the cooling segment 306. This further cooling effect reduces the contact temperature of the user's lips on the surface of the filter segment 308.

One or more flavours may be added to the filter segment 308 in the form of either direct injection of flavoured liquids into the filter segment 308 or by embedding or arranging one or more flavoured breakable capsules or other flavour carriers within the cellulose acetate tow of the filter segment 308.

In one example, the filter segment 308 is between 6 mm to 10 mm in length, more preferably 8 mm.

The mouth end segment 310 is an annular tube and is located around and defines an air gap within the mouth end segment 310. The air gap provides a chamber for heated volatilised components that flow from the filter segment 308. The mouth end segment 310 is hollow to provide a chamber for aerosol accumulation yet rigid enough to withstand axial compressive forces and bending moments that might arise during manufacture and whilst the article is in use during insertion into the device 100. In one example, the thickness of the wall of the mouth end segment 310 is approximately 0.29 mm.

In one example, the length of the mouth end segment 310 is between 6 mm to 10 mm and more preferably 8 mm. In one example, the thickness of the mouth end segment is 0.29 mm.

The mouth end segment 310 may be manufactured from a spirally wound paper tube which provides a hollow internal chamber yet maintains critical mechanical rigidity. Spirally wound paper tubes are able to meet the tight dimensional accuracy requirements of high-speed manufacturing processes with respect to tube length, outer diameter, roundness and straightness.

The mouth end segment 310 provides the function of preventing any liquid condensate that accumulates at the exit of the filter segment 308 from coming into direct contact with a user.

It should be appreciated that, in one example, the mouth end segment 310 and the cooling segment 306 may be formed of a single tube and the filter segment 308 is located within that tube separating the mouth end segment 310 and the cooling segment 306.

A ventilation region 316 is provided in the article 300 to enable air to flow into the interior of the article 300 from the exterior of the article 300. In one example the ventilation region 316 takes the form of one or more ventilation holes 316 formed through the outer layer of the article 300. The ventilation holes may be located in the cooling segment 306 to aid with the cooling of the article 300. In one example, the ventilation region 316 comprises one or more rows of holes, and preferably, each row of holes is arranged circumferentially around the article 300 in a cross-section that is substantially perpendicular to a longitudinal axis of the article 300.

In one example, there are between one to four rows of ventilation holes to provide ventilation for the article 300. Each row of ventilation holes may have between 12 to 36 w ventilation holes 316. The ventilation holes 316 may, for example, be between 100 to 500 μm in diameter. In one example, an axial separation between rows of ventilation holes 316 is between 0.25 mm and 0.75 mm, more preferably, an axial separation between rows of ventilation holes 316 is 0.5 mm.

In one example, the ventilation holes 316 are of uniform size. In another example, the ventilation holes 316 vary in size. The ventilation holes can be made using any suitable technique, for example, one or more of the following techniques: laser technology, mechanical perforation of the cooling segment 306 or pre-perforation of the cooling segment 306 before it is formed into the article 300. The ventilation holes 316 are positioned so as to provide effective cooling to the article 300.

In one example, the rows of ventilation holes 316 are located at least 11 mm from the proximal end 312 of the article, more preferably the ventilation holes are located between 17 mm and 20 mm from the proximal end 312 of the article 300. The location of the ventilation holes 316 is positioned such that user does not block the ventilation holes 316 when the article 300 is in use.

Advantageously, providing the rows of ventilation holes between 17 mm and 20 mm from the proximal end 312 of the article 300 enables the ventilation holes 316 to be located outside of the device 100, when the article 300 is fully inserted in the device 100, as can be seen in FIG. 1. By locating the ventilation holes outside of the apparatus, non-heated air is able to enter the article 300 through the ventilation holes from outside the device 100 to aid with the cooling of the article 300.

The length of the cooling segment 306 is such that the cooling segment 306 will be partially inserted into the device 100, when the article 300 is fully inserted into the device 100. The length of the cooling segment 306 provides a first function of providing a physical gap between the heater arrangement of the device 100 and the heat sensitive filter arrangement 308, and a second function of enabling the ventilation holes 316 to be located in the cooling segment, whilst also being located outside of the device 100, when the article 300 is fully inserted into the device 100. As can be seen from FIG. 1, the majority of the cooling element 306 is located within the device 100. However, there is a portion of the cooling element 306 that extends out of the device 100. It is in this portion of the cooling element 306 that extends out of the device 100 in which the ventilation holes 316 are located.

Figure 11:
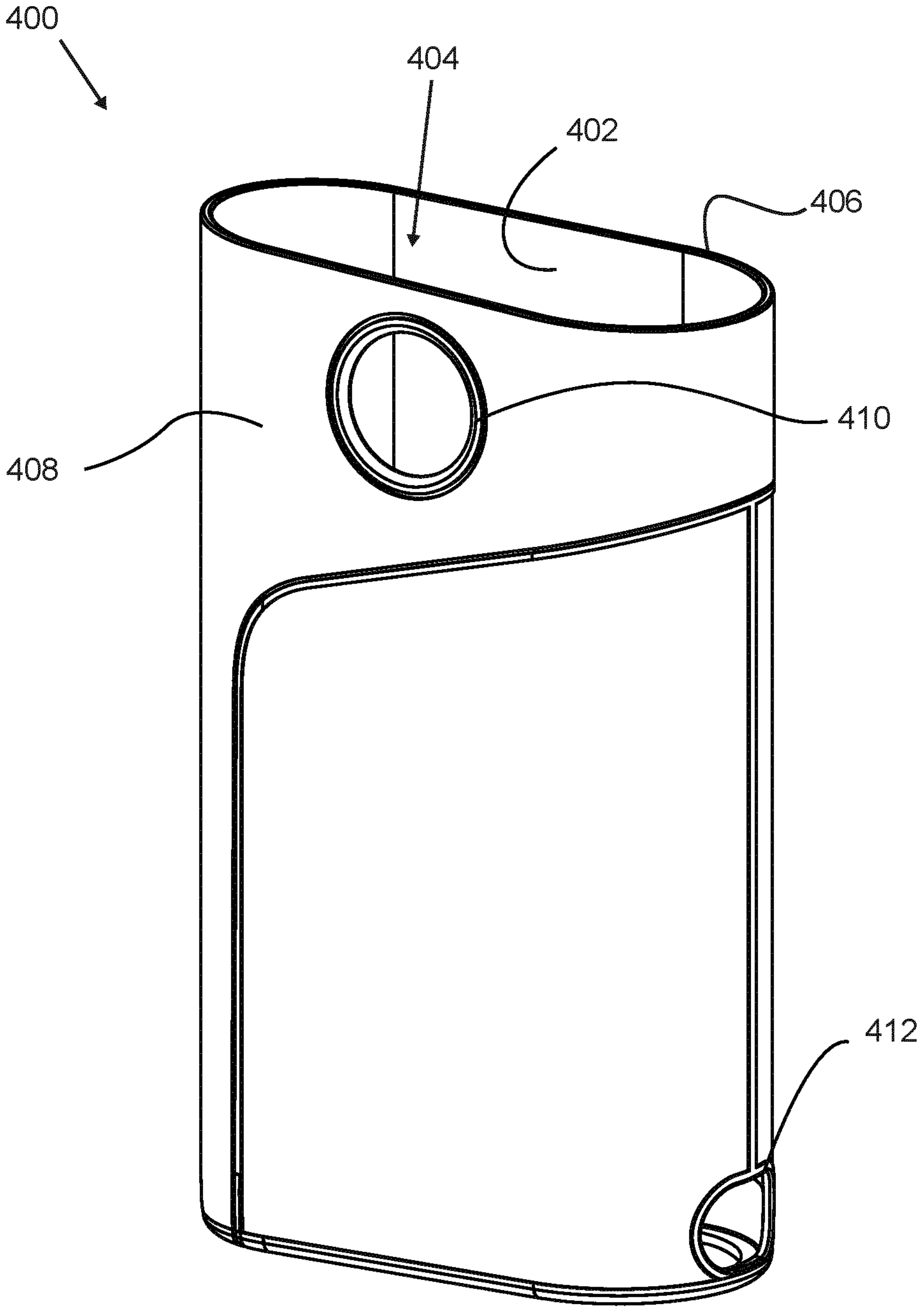
FIG. 11 is a perspective view of a removable cover to be used in combination with an aerosol-generating device according to an example.

FIG. 11 shows a removable cover 400 for an aerosol-generating device 100 as shown in FIGS. 1 to 8.

The removable cover 400 has an inner surface 402 which is configured such that, when the cover 400 is provided on the aerosol-generating device 100, the inner surface 402 contacts at least a portion of the housing 102 of the aerosol-generating device. In the example shown, in use the inner surface 402 contacts at least a portion of the front face 110, the rear face 112, the first side portion 114, and the second side portion 116 of the body portion.

The inner surface 402 defines a volume 404 within which the aerosol-generating device 100 may be arranged in use.

The removable cover 400 has an opening 406 through which the aerosol-generating device 100 can be supplied to the volume 404 or removed from the volume 404.

The removable cover 400 has an outer surface 408 which is configured such that, when the cover 400 is provided on the aerosol-generating device 100, a user can touch the outer surface 408 of the removable cover 400 when interacting with the aerosol-generating device.

The removable cover 400 comprises a first aperture 410 arranged to correspond to the user interface 144 and the indicator 146 of the device 100. That is, when the device 100 is arranged within the removable cover 400, the first aperture 410 is positioned around the user interface 144 and indicator 146 such that the removable cover 400 does not cover the user interface 144 or the indicator 146 of the device 100.

The removable cover 400 comprises a second aperture 412 arranged to correspond to a socket/port for receiving a cable to charge a battery of the device 100. That is, when the device 100 is arranged within the removable cover 400, the second aperture 412 is positioned around the socket/port such that a power cable can pass through the second aperture 412 to the socket/port of the device 100. The second aperture 412 typically corresponds to the aperture 148 of the housing 102.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aerosol-generating device for generating aerosol from an aerosol-generating material, the aerosol-generating device comprising:

a housing; and a heating assembly arranged in the housing for receiving aerosol-generating material, the heating assembly being configured to heat aerosol-generating material received in the heating assembly, wherein at least a portion of the housing has a soft touch coating, wherein the housing comprises a body portion, a base and a top portion, the body portion extending along a first direction from the base portion to the top portion, wherein the body portion is a substantially tubular element defining a lumen which extends along a first axis in the first direction, the tubular element being open at both a first end and a second end, wherein the body portion comprises an inner surface facing the first axis of the lumen and an outer surface facing away from the first axis of the lumen, and wherein the body portion comprises a connecting face, the connecting face connecting the inner surface and the outer surface, wherein the connecting face is connected to the inner surface by an inner edge, and the connecting face is connected to the outer surface by an outer edge.

2. The aerosol-generating device of claim 1, wherein the base extends across a first plane substantially perpendicular to the first direction; and wherein the body portion is a monolithic element.

3. The aerosol-generating device of claim 1, wherein the base and top face of the housing are arranged to close the openings at the first end and second end.

4. The aerosol-generating device of claim 1, wherein the portion of the housing having a soft touch coating includes a portion of the outer surface of the body portion.

5. The aerosol-generating device of claim 1, wherein the connecting face is substantially planar and extends across the first plane; wherein the outer edge is a rounded edge; and wherein the portion of the housing having a soft touch coating includes the connecting face; wherein the portion of the housing having a soft touch coating includes a portion of the inner surface.

6. The aerosol-generating device of claim 1, wherein the portion having the soft touch coating is a continuous portion extending along portions of the outer surface, the outer edge, the connecting face, the inner edge, and the inner surface; and wherein the portion of the inner surface having a soft touch coating has an extent from the inner edge in the first direction of from 0.5 mm to 3 mm.

7. The aerosol-generating device of claim 1, wherein the heating assembly comprises at least one induction heating unit.

8. The aerosol-generating device of claim 1, in combination with an aerosol-generating article.

9. A kit comprising an aerosol-generating device of claim 1, in combination with a removable cover for the aerosol-generating device.

10. A body portion for a housing of an aerosol-generating device, wherein the body portion is a substantially tubular element defining a lumen which extends along a first axis in a first direction, the tubular element being open at both a first end and a second end, the body portion comprising:

an inner surface facing the first axis of the lumen;

an outer surface facing the opposite direction to the first axis of the lumen;

a connecting face connecting the inner surface and the outer surface;

wherein the connecting face is connected to the inner surface by an inner edge and to the outer surface by an outer edge, and wherein at least a portion of the body portion is provided with a soft touch coating.

11. The body portion of claim 10, wherein the connecting face is substantially planar and extends in a first plane substantially perpendicular to the first direction; wherein the outer edge is a rounded edge and the inner edge forms a right angle between the connecting face and inner surface; and wherein the shortest distance between the inner edge and the outer edge across the connecting face is from 0.5 mm to 5 mm.

12. The body portion of claim 10, further comprising a recess arranged along the outer surface of the body portion, wherein the recess forms a channel having a substantially constant width and a depth along the recess, the width and/or being from 0.4 to 1.2 mm; wherein the depth of the recess is equal to or less than the width of the recess; and wherein the channel comprises a base extending along the bottom of the channel, a first wall connecting a first edge of the channel base to the outer surface of the body portion, and a second wall connecting a second edge of the channel base to the outer surface of the body portion.

13. The body portion of claim 10, wherein at least a portion of the body portion is provided with a soft touch coating.

14. A method of applying a soft touch coating to a body portion, the method comprising:

supplying a soft touch coating precursor to a continuous portion of the body portion extending along portions of the outer surface, the outer edge, the connecting face, the inner edge, and the inner surface; and treating the soft touch coating precursor to provide a soft touch coating to the continuous portion.

15. The method of 14, wherein the continuous portion extends along the entire outer edge, the entire connecting face, and the entire inner surface.

16. The method of claim 14, further comprising:

supplying a coating precursor to a continuous portion of the body portion extending along portions of the outer surface, first or second side wall of the recess, and the base of the channel; and treating the coating precursor to provide a coating to the continuous portion, wherein the coating precursor is a soft touch coating precursor for providing a soft touch coating.

* * * * *